(12) United States Patent
Utsunomiya

(10) Patent No.: US 12,194,636 B2
(45) Date of Patent: Jan. 14, 2025

(54) THREE-DIMENSIONAL OBJECT PRINTING METHOD AND DATA GENERATION METHOD

(71) Applicant: Seiko Epson Corporation, Tokyo (JP)

(72) Inventor: Kohei Utsunomiya, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 278 days.

(21) Appl. No.: 17/702,878

(22) Filed: Mar. 24, 2022

(65) Prior Publication Data

US 2022/0305655 A1 Sep. 29, 2022

(30) Foreign Application Priority Data

Mar. 25, 2021 (JP) .................................. 2021-051072

(51) Int. Cl.
*B25J 9/16* (2006.01)
*B25J 11/00* (2006.01)
*B41J 3/407* (2006.01)

(52) U.S. Cl.
CPC ............. *B25J 9/1664* (2013.01); *B25J 9/163* (2013.01); *B25J 9/1669* (2013.01); *B25J 11/0075* (2013.01); *B41J 3/40731* (2020.08)

(58) Field of Classification Search
CPC ........ B25J 9/1664; B25J 9/163; B25J 9/1669; B25J 11/0075; B25J 11/00; B25J 9/0084; B41J 3/40731; B41J 2/2114; B41J 3/4073
See application file for complete search history.

(56) References Cited

U.S. PATENT DOCUMENTS

| | | | | |
|---|---|---|---|---|
| 2006/0247800 A1* | 11/2006 | Takenaka | ............. | B62D 57/032 700/54 |
| 2013/0068743 A1* | 3/2013 | Delin | ................. | B23K 37/0205 219/130.01 |
| 2013/0081293 A1* | 4/2013 | Delin | ................. | B23K 37/0205 33/301 |
| 2013/0317646 A1* | 11/2013 | Kimoto | ................. | B25J 9/1651 700/250 |

(Continued)

FOREIGN PATENT DOCUMENTS

| | | |
|---|---|---|
| JP | 2000-238254 A | 9/2000 |
| JP | 2005-001131 A | 1/2005 |

(Continued)

*Primary Examiner* — Sohana Tanju Khayer
(74) *Attorney, Agent, or Firm* — Harness, Dickey & Pierce, P.L.C.

(57) ABSTRACT

Disclosed is a three-dimensional object printing method using a head and a robot that changes relative position and relative orientation of a workpiece and the head. The method includes a first data processing step of acquiring first initial route data that represents, in a workpiece coordinate system, a route along which the head is to move; a second data processing step of acquiring first head reference point data that represents, in a robot coordinate system, position and orientation of the head; a third data processing step of generating, based on the first initial route data and the first head reference point data, first print route data that represents, in the robot coordinate system, the route along which the head is to move; and a first printing step of ejecting the liquid from the head onto the workpiece while the robot is operated based on the first print route data.

13 Claims, 13 Drawing Sheets

(56) References Cited

U.S. PATENT DOCUMENTS

| | | | | |
|---|---|---|---|---|
| 2015/0138275 A1* | 5/2015 | Noell | ............ | B41J 3/4073 |
| | | | | 347/37 |
| 2015/0231897 A1* | 8/2015 | Noell | ............ | B41J 3/4073 |
| | | | | 347/102 |
| 2016/0151833 A1* | 6/2016 | Tsao | ............ | B23K 9/04 |
| | | | | 219/136 |
| 2016/0176055 A1* | 6/2016 | McGlinchy | ............ | B25J 9/1664 |
| | | | | 901/41 |
| 2018/0001625 A1 | 1/2018 | Ono et al. | | |
| 2018/0036883 A1 | 2/2018 | Nishitani et al. | | |
| 2018/0194009 A1* | 7/2018 | Kojima | ............ | B25J 9/0018 |
| 2018/0233397 A1* | 8/2018 | Hosek | ............ | B25J 9/046 |
| 2019/0160671 A1* | 5/2019 | Kurihara | ............ | B25J 13/06 |
| 2020/0361145 A1* | 11/2020 | Tsao | ............ | B29C 64/118 |
| 2021/0057251 A1* | 2/2021 | Matsuoka | ............ | H01L 21/67742 |
| 2021/0300061 A1* | 9/2021 | Boniface | ............ | B41J 11/00214 |
| 2021/0394455 A1* | 12/2021 | Stadnik | ............ | H01L 23/552 |
| 2024/0042611 A1* | 2/2024 | Takeda | ............ | B25J 9/1674 |

FOREIGN PATENT DOCUMENTS

| | | | |
|---|---|---|---|
| JP | 2011-177931 | A | 9/2011 |
| JP | 2012-144264 | A | 8/2012 |
| JP | 2016-215438 | A | 12/2016 |
| JP | 2018-001571 | A | 1/2018 |
| JP | 2018-020412 | A | 2/2018 |
| WO | 2020/162171 | A1 | 8/2020 |

\* cited by examiner

THREE-DIMENSIONAL OBJECT PRINTING METHOD AND DATA GENERATION METHOD The present application is based on, and claims priority from JP Application Serial Number 2021-051072, filed Mar. 25, 2021, the disclosure of which is hereby incorporated by reference herein in its entirety.

BACKGROUND

1. Technical Field

Embodiments of the present disclosure relate to a three-dimensional object printing method and a data generation method.

2. Related Art

A three-dimensional object printing method of performing printing on a surface of a three-dimensional workpiece using an ink-jet technique is known. For example, in a method disclosed in JP-A-2005-001131, an optical material is ejected from an ink-jet head onto a molded part while the ink-jet head is moved in relation to the molded part, thereby forming a contact lens. The relative movement of the ink-jet head in relation to the molded part is controlled based on data representing the shape of the contact lens.

JP-A-2005-001131 does not disclose a specific method as to how to generate data that represents a route along which the ink-jet head should move. To perform printing on a workpiece with a variety of shapes, there is a demand for a solution that makes it possible to, for example, easily generate a route along which the head should move suitably for the shape and size, etc. of the workpiece and to easily change the route.

SUMMARY

A certain aspect of the present disclosure is a three-dimensional object printing method using a head and a robot, the head being configured to eject a liquid onto a workpiece, the robot being configured to change relative position and relative orientation of the workpiece and the head, comprising: a first data processing step of acquiring first initial route data that represents, in a workpiece coordinate system, a route along which the head is to move; a second data processing step of acquiring first head reference point data that represents, in a robot coordinate system, position and orientation of the head; a third data processing step of generating, based on the first initial route data and the first head reference point data, first print route data that represents, in the robot coordinate system, the route along which the head is to move; and a first printing step of ejecting the liquid from the head onto the workpiece while the robot is operated based on the first print route data.

Another aspect of the present disclosure is a data generation method of generating data in a robot coordinate system from data in a workpiece coordinate system, comprising: a first step of acquiring initial route data that represents, in the workpiece coordinate system, a route along which an end effector is to move; a second step of acquiring reference teaching point data that represents, in the robot coordinate system, position and orientation of the end effector; and a third step of generating, based on the initial route data and the reference teaching point data, teaching data that represents, in the robot coordinate system, the route along which the end effector is to move.

DESCRIPTION OF EXEMPLARY EMBODIMENTS

Figure 1:
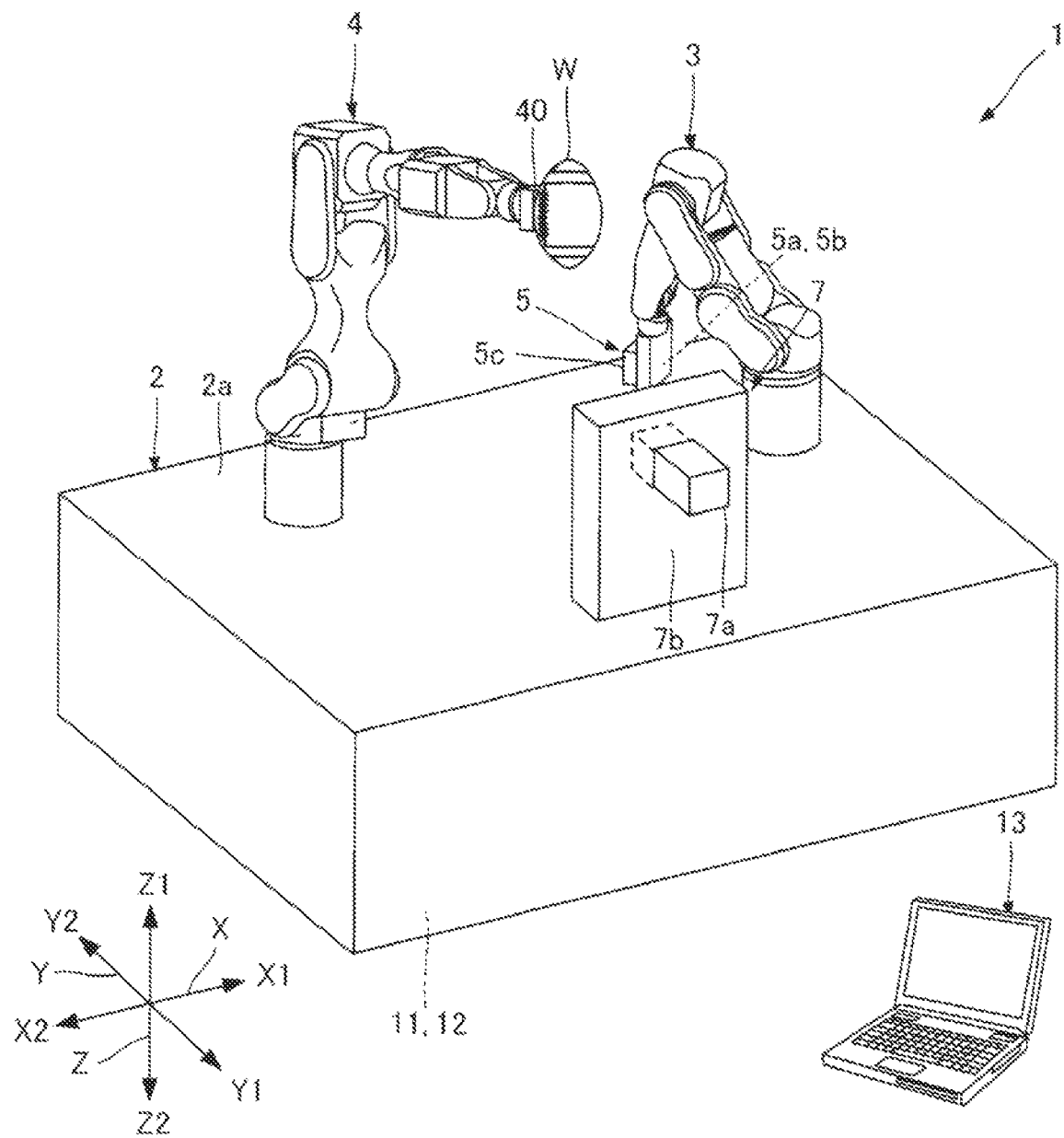
FIG. 1 is a perspective view for providing an overview of a three-dimensional object printing apparatus used in a three-dimensional object printing method according to a first embodiment.

With reference to the accompanying drawings, some preferred embodiments of the present disclosure will now be described. The dimensions and scales of components illustrated in the drawings may be different from actual dimensions and scales, and some components may be schematically illustrated for easier understanding. The scope of the present disclosure shall not be construed to be limited to these specific examples unless and except where the description below contains an explicit mention of an intent to limit the present disclosure.

To facilitate the readers' understanding, the description below will be given with reference to X, Y, and Z axes intersecting with one another. In the description below, one direction along the X axis will be referred to as the X1 direction, and the direction that is the opposite of the X1 direction will be referred to as the X2 direction. Similarly, directions that are the opposite of each other along the Y axis will be referred to as the Y1 direction and the Y2 direction. Directions that are the opposite of each other along the Z axis will be referred to as the Z1 direction and the Z2 direction.

The X, Y, and Z axes are coordinate axes of a world coordinate system set in a space in which a robot 10 including a first robot 3 and a second robot 4 described later are installed. Typically, the Z axis is a vertical axis, and the Z2 direction corresponds to a vertically downward direction. A base coordinate system whose reference is on the base portion of each of the first robot 3 and the second robot 4 is associated with the world coordinate system by calibration. In the description below, for the purpose of explanation, a case where each of the operation of the first robot 3 and the operation of the second robot 4 is controlled using the world coordinate system as a robot coordinate system will be taken as an example.

The Z axis does not necessarily have to be a vertical axis. The X, Y, and Z axes are typically orthogonal to one another, but are not limited thereto, meaning that they could be mutually non-orthogonal axes. For example, it is sufficient as long as the X, Y, and Z axes intersect with one another within an angular range of 80° or greater and 100° or less.

1. First Embodiment

1-1. Overview of Apparatus Used in Three-Dimensional Object Printing Method

FIG. 1 is a perspective view for providing an overview of a three-dimensional object printing apparatus 1 used in a three-dimensional object printing method according to a first embodiment. The three-dimensional object printing apparatus 1 is an apparatus that performs ink-jet printing on a surface of a three-dimensional workpiece W with the use of the robot 10 including the first robot 3 and the second robot 4.

In the example illustrated in FIG. 1, the workpiece W is a rugby ball having a shape of a prolate spheroid. The size, shape, etc. of the workpiece W is not limited to the example illustrated in FIG. 1. The workpiece W may have any size, shape, etc.

As illustrated in FIG. 1, the three-dimensional object printing apparatus 1 includes a base 2, the first robot 3, the second robot 4, a head unit 5, an imaging unit 7, a controller 11, a control module 12, and a computer 13. First, a brief explanation of each component of the three-dimensional object printing apparatus 1 illustrated in FIG. 1 will now be given below sequentially.

The base 2 is a table that has a top 2a supporting the first robot 3 and the second robot 4. The top 2a is a surface facing in the Z1 direction. In the present embodiment, the top 2a supports not only the first robot 3 and the second robot 4 but also the imaging unit 7. Each of the first robot 3, the second robot 4, and the imaging unit 7 is fastened to the base 2 with screws either directly or indirectly with other member interposed therebetween.

In the example illustrated in FIG. 1, the base 2 has a box-like shape, and the controller 11 and the control module 12 are housed inside the base 2.

The structure of the base 2 is not limited to the example illustrated in FIG. 1. The base 2 may have any structure. The base 2 is not indispensable and thus may be omitted. If the base 2 is omitted, each component of the three-dimensional object printing apparatus 1 is provided on, for example, the floor, wall, ceiling, etc. of a building. In the present embodiment, each component of the three-dimensional object printing apparatus 1 excluding the base 2 is supported by the top 2a, that is, on one and the same plane. However, these components may be supported on planes facing in different directions. For example, the first robot 3 may be installed on one of the floor, wall, and ceiling, and the second robot 4 may be installed on another one of them. The first robot 3 may be installed on one of walls facing in different directions, and the second robot 4 may be installed on another one of them.

The first robot 3 is a robot that changes the position and orientation of the head unit 5 in the world coordinate system. In the example illustrated in FIG. 1, the first robot 3 is a so-called six-axis vertical articulated robot. The head unit 5 is mounted as an end effector on the distal end of the arm of the first robot 3 and is fastened thereto with screws. The structure of the first robot 3 will be described later with reference to FIG. 3.

The head unit 5 is an assembly that has a head 5a configured to eject ink, which is an example of "a liquid", toward the workpiece W. In the present embodiment, besides the head 5a, the head unit 5 includes a pressure adjustment valve 5b and a curing light source 5c. The structure of the head unit 5 will be described later with reference to FIG. 4.

The ink is not limited to any specific kind of ink. Examples of the ink include water-based ink in which a colorant such as dye or pigment is dissolved in a water-based dissolvent (solvent), curable ink using curable resin such as UV (ultraviolet) curing resin, solvent-based ink in which a colorant such as dye or pigment is dissolved in an organic solvent. Among them, curable ink can be used as a preferred example. The curable ink is not limited to any specific kind of curable ink. For example, any of thermosetting-type ink, photo-curable-type ink, radiation-curable-type ink, electron-beam-curable-type ink, and the like, may be used. A preferred example is photo-curable-type ink such as UV curing ink. The ink is not limited to a solution and may be formed by dispersion of a colorant or the like as a dispersoid in a dispersion medium. The ink is not limited to ink containing a colorant. For example, the ink may contain, as a dispersoid, conductive particles such as metal particles for forming wiring lines, etc. Alternatively, the ink may be clear ink, or a treatment liquid for surface treatment of the workpiece W.

The second robot 4 is a robot that changes the position and orientation of the workpiece W in the world coordinate system. In the example illustrated in FIG. 1, the second robot 4 is another six-axis vertical articulated robot. A hand mechanism 40 is mounted as an end effector on the distal end of the arm of the second robot 4 and is fastened thereto with screws.

The second robot 4 has the same structure as that of the first robot 3 except that the end effector mounted on the second robot 4 is different from that of the first robot 3. However, the structure of the first robot 3 and the structure of the second robot 4 may be different from each other. In the present embodiment, the structure parameters of the first robot 3 and the second robot 4 such as arm length and/or weight capacity, etc. are made different from each other as needed. The number of joints of the first robot 3 and the number of joints of the second robot 4 may be different from each other.

The hand mechanism 40 is a robot hand configured to hold the workpiece W detachably. The concept of the term "hold" used here includes both "chuck" and "grip". In the example illustrated in FIG. 1, the hand mechanism 40 utilizes negative pressure to suction-hold the workpiece W. The structure of the hand mechanism 40 is determined suitably depending on the shape, size, material, etc. of the workpiece W. The hand mechanism 40 is not limited to a suction-holding mechanism that utilizes negative pressure. For example, the hand mechanism 40 may be a magnetic attraction mechanism. The hand mechanism 40 may be a gripping hand mechanism that has a plurality of fingers or claws, etc.

The imaging unit 7 is an apparatus that detects the position and orientation of the workpiece W. The imaging unit 7 includes an imaging device 7a and a lighting device 7b. The imaging device 7a is generally called as "vision sensor". The imaging device 7a is a camera that includes an imaging optical system and an imager. The imaging device 7a captures an image of an object located inside an imaging area. The imaging optical system is an optical system that includes at least one imaging lens. The imaging optical system may include various kinds of optical device such as a prism. The imaging optical system may include a zoom lens or a focus lens, etc. The imager is, for example, a CCD (Charge Coupled Device) image sensor or a CMOS (Complementary MOS) image sensor, etc. The imaging device 7a may be a depth camera that has a function of detecting the distance between the subject and the imaging device 7a.

A two-axis or three-axis imaging coordinate system whose reference lies at a particular point in an image to be captured is set for the imaging device 7a. The imaging coordinate system is associated with the base coordinate system or the world coordinate system described earlier by calibration. The lighting device 7b is a light source that includes a light emitting element such as an LED (light emitting diode). The lighting device 7b emits light toward the imaging area of the imaging device 7a. Thanks to lighting by the lighting device 7b, it is possible to enhance the contrast of an image captured by the imaging device 7a when an image of the workpiece W is captured as the object. Consequently, it is possible to improve precision in detecting the position and orientation of the workpiece W based on the result of image capturing by the imaging device 7a. Optical components such as a lens for adjusting the direction or range of light emission, a reflector, etc. are provided for the lighting device 7b as needed.

Figure 2:
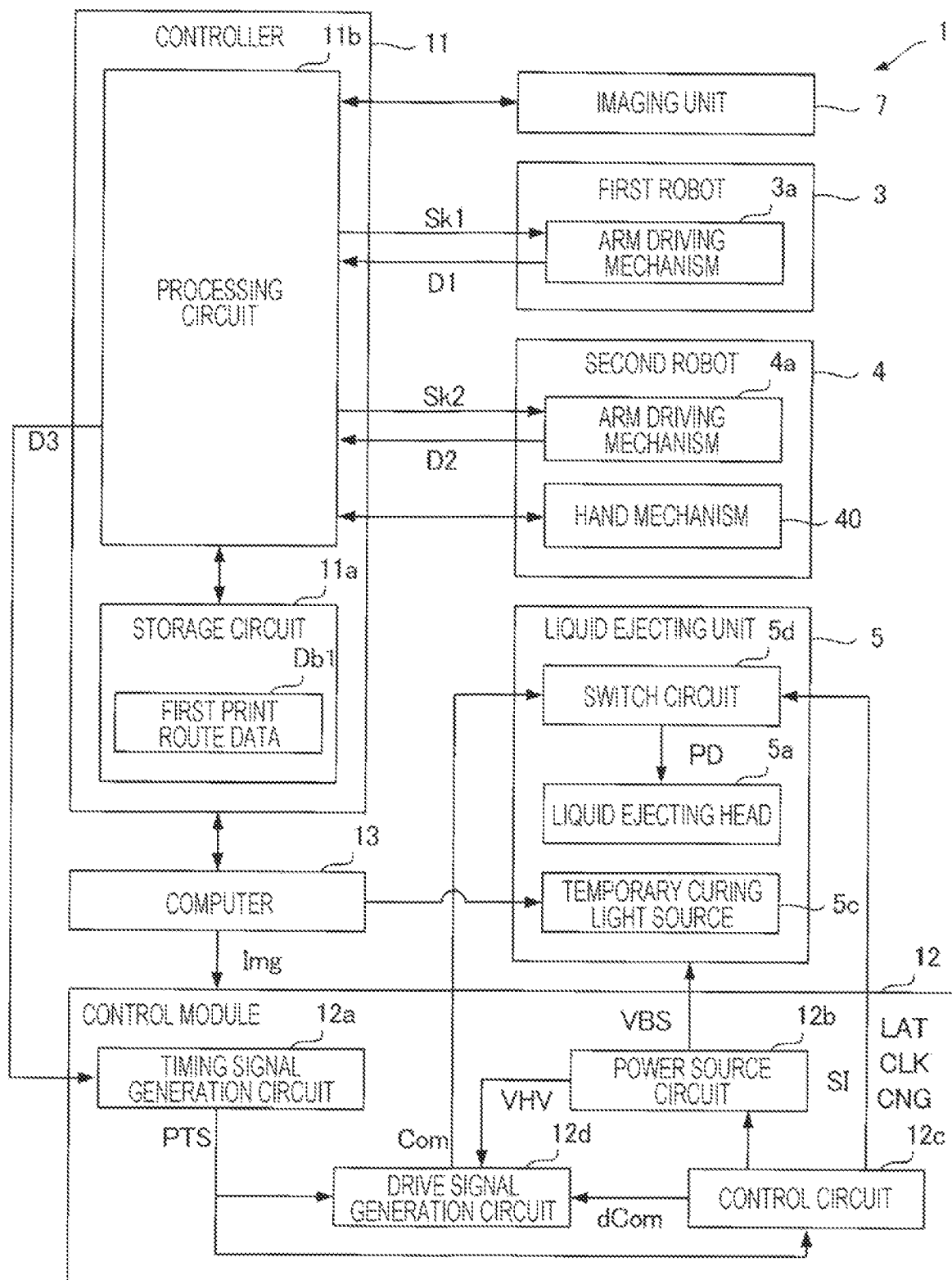
FIG. 2 is a block diagram that illustrates the electric configuration of the three-dimensional object printing apparatus used in the three-dimensional object printing method according to the first embodiment.

The controller 11 is a robot controller that controls the driving of the first robot 3 and the driving of the second robot 4. The control module 12 is a circuit module connected to the controller 11 in such a way as to be able to communicate therewith and configured to control the head unit 5. The computer 13 is connected to the controller 11 and the control module 12 in such a way as to be able to communicate therewith. In the example illustrated in FIG. 1, the computer 13 is a notebook computer. However, the scope of the present disclosure is not limited thereto. For example, the computer 13 may be a desktop computer. With reference to FIG. 2, the electric configuration of the three-dimensional object printing apparatus 1 will be described next.

1-2. Electric Configuration of Three-Dimensional Object Printing Apparatus

FIG. 2 is a block diagram that illustrates the electric configuration of the three-dimensional object printing apparatus 1 used in the three-dimensional object printing method according to the first embodiment. In FIG. 2, among the components of the three-dimensional object printing apparatus 1, electric components are illustrated. Any of the electric components illustrated in FIG. 1 may be split into two or more sub components as needed. A part of one electric component may be included in another electric component. One electric component may be integrated with another electric component. For example, a part or a whole of the functions of the controller 11 or the control module 12 may be embodied by the computer 13, or by an external device such as a PC (personal computer) connected to the controller 11 via a network such as LAN (Local Area Network) or the Internet, etc.

The controller 11 has a function of controlling the driving of the first robot 3 and the driving of the second robot 4 and a function of generating a signal D3 for synchronizing the ink-ejecting operation of the head unit 5 with the kinematic operation of the first robot 3. The controller 11 includes a storage circuit 11a and a processing circuit 11b.

The storage circuit 11a stores various programs that are to be run by the processing circuit 11b and various kinds of data that are to be processed by the processing circuit 11b. The storage circuit 11a includes, for example, a semiconductor memory that is either one of a volatile memory and a nonvolatile memory, or semiconductor memories constituted by both thereof. The volatile memory is, for example, a random-access memory (RAM), and the nonvolatile memory is, for example, a read-only memory (ROM), an electrically erasable programmable read-only memory (EEPROM), or a programmable ROM (PROM). A part or a whole of the storage circuit 11a may be included in the processing circuit 11b.

Figure 5:
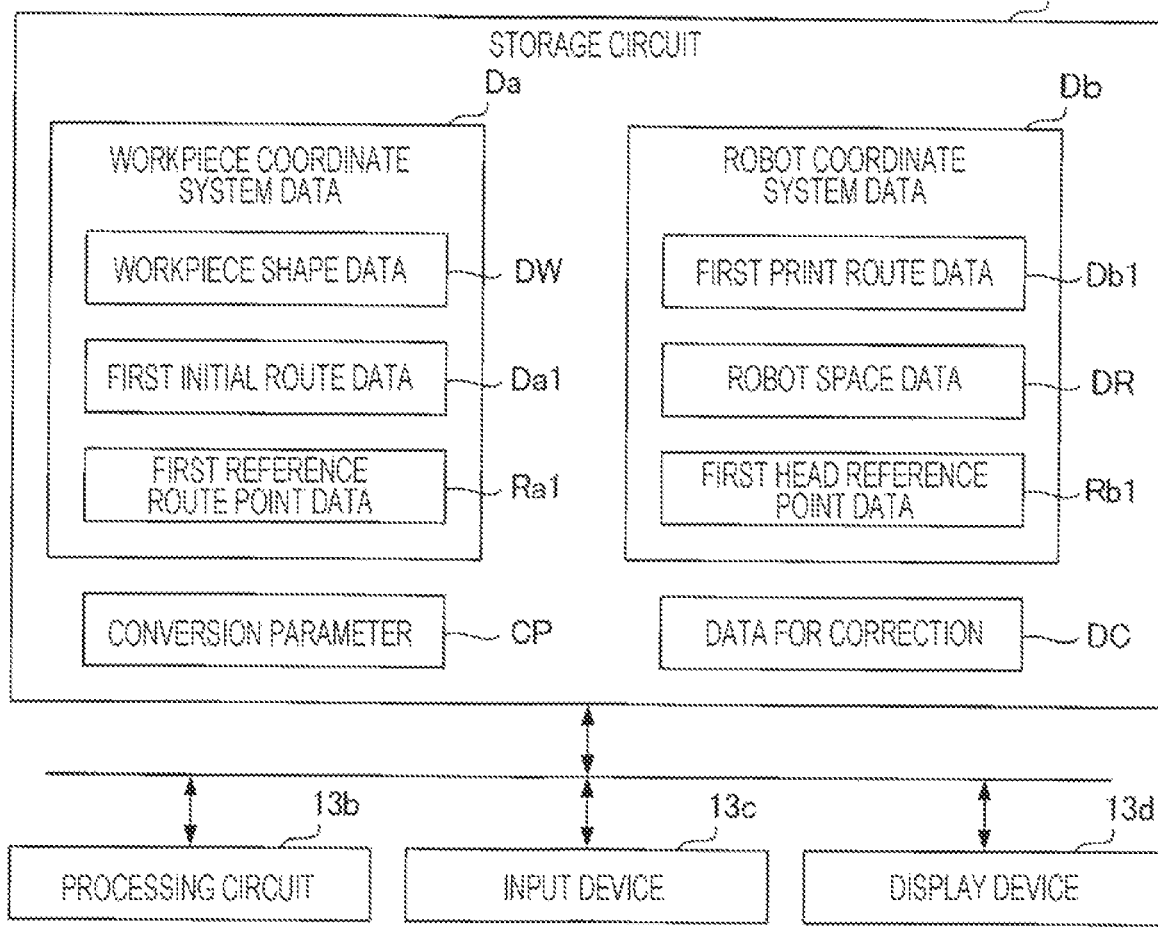
FIG. 5 is a diagram that illustrates a computer used in a data generation method according to the first embodiment.

First print route data Db1 is stored in the storage circuit 11a. The first print route data Db1 includes route information about a route along which the head unit 5 should move and positioning information about position at which and orientation in which the workpiece W should be positioned. The first print route data Db1 is generated by the computer 13. The route information corresponds to pieces of teaching point data Pb_1 to Pb_N, which are illustrated in FIG. 5 and will be described later. The positioning information corresponds to workpiece positioning point data DbC, which is illustrated in FIG. 5 and will be described later. A more detailed explanation of the route information and the positioning information, and about the generation of them, will be given later.

Based on the route information included in the first print route data Db1, the processing circuit 11b controls the operation of an arm driving mechanism 3a of the first robot 3 and generates the signal D3. Based on the positioning information included in the first print route data Db1, the processing circuit 11b controls the operation of an arm driving mechanism 4a of the second robot 4. Based on the result of image capturing by the imaging unit 7, the processing circuit 11b corrects the operation of either one of the arm driving mechanism 3a and the arm driving mechanism 4a during printing, or both, as may be needed. The processing circuit 11b includes one or more processors, for example, CPU (central processing unit). Instead of the CPU or in addition to the CPU, the processing circuit 11b may include a programmable logic device, for example, FPGA (field-programmable gate array).

The arm driving mechanism 3a includes motors for driving the respective joints of the first robot 3 and encoders for detecting the rotation angles of the respective joints of the first robot 3. Similarly, the arm driving mechanism 4a includes motors for driving the respective joints of the second robot 4 and encoders for detecting the rotation angles of the respective joints of the second robot 4.

The processing circuit 11b performs inverse kinematics calculation that is a computation for converting the route information included in the first print route data Db1 into the amount of operation such as the angle of rotation and the speed of rotation, etc. of each of the joints of the first robot 3. Then, based on an output D1 from each of the encoders of the arm driving mechanism 3a, the processing circuit 11b outputs a control signal Sk1 such that the actual amount of operation such as the actual angle of rotation and the actual speed of rotation, etc. of each of the joints will be equal to the result of the computation. The control signal Sk1 is a signal for controlling the motor of the arm driving mechanism 3a.

Similarly, the processing circuit 11b performs inverse kinematics calculation that is a computation for converting the positioning information included in the first print route data Db1 into the amount of operation such as the angle of rotation and the speed of rotation, etc. of each of the joints of the second robot 4. Then, based on an output D2 from each of the encoders of the arm driving mechanism 4a, the processing circuit 11b outputs a control signal Sk2 such that the actual amount of operation such as the actual angle of rotation and the actual speed of rotation, etc. of each of the joints will be equal to the result of the computation. The control signal Sk2 is a signal for controlling the motors of the arm driving mechanism 4a.

Based on the result of image capturing by the imaging device 7a of the imaging unit 7, the processing circuit 11b detects the position and orientation of the workpiece W during printing. Then, based on the detection result and the positioning information, the processing circuit 11b corrects the control signal Sk2 during printing such that the difference between the detection result and the position and orientation indicated by the positioning information will be reduced. The position and orientation of the workpiece W can be obtained by, for example, converting the position and orientation of the workpiece W in the image captured by the imaging device 7a from the imaging coordinate system into the world coordinate system. The position and orientation of the workpiece W in the imaging coordinate system is calculated based on, for example, the position of the characteristic point of the workpiece W in the captured image and shape information of the workpiece W. The detection of the position and orientation of the workpiece W based on the result of image capturing by the imaging device 7a may be performed either by an image processing circuit included in the imaging device 7a or by the computer 13.

Based on the output D1 from at least one of the encoders of the arm driving mechanism 3a, the processing circuit 11b generates the signal D3. For example, the processing circuit 11b generates, as the signal D3, a trigger signal that includes a pulse of timing at which the value of the output D1 from at least one of the plurality of encoders becomes a predetermined value.

The control module 12 is a circuit that controls, based on the signal D3 outputted from the controller 11 and print data outputted from the computer 13, the ink-ejecting operation of the head unit 5. The control module 12 includes a timing signal generation circuit 12a, a power source circuit 12b, a control circuit 12c, and a drive signal generation circuit 12d.

Based on the signal D3, the timing signal generation circuit 12a generates a timing signal PTS. The timing signal generation circuit 12a is, for example, a timer configured to start the generation of the timing signal PTS when triggered by the detection of the signal D3.

The power source circuit 12b receives supply of external power from a commercial power source that is not illustrated, and generates various predetermined levels of voltage. The various voltages generated by the power source circuit 12b are supplied to components of the control module 12 and the head unit 5. For example, the power source circuit 12b generates a power voltage VHV and an offset voltage VBS. The offset voltage VBS is supplied to the head unit 5. The power voltage VHV is supplied to the drive signal generation circuit 12d.

Based on the timing signal PTS, the control circuit 12c generates a control signal SI, a waveform specifying signal dCom, a latch signal LAT, a clock signal CLK, and a change signal CNG. These signals are in synchronization with the timing signal PTS. Among these signals, the waveform specifying signal dCom is inputted into the drive signal generation circuit 12d. The rest of them are inputted into a switch circuit 5d of the head unit 5.

The control signal SI is a digital signal for specifying the operation state of the drive element of the head 5a of the head unit 5. Specifically, the control signal SI specifies whether to supply a drive signal Com, which will be described later, to the drive element or not. For example, the control signal SI specifies whether to eject ink from the nozzle corresponding to this drive element or not and specifies the amount of ink ejected from this nozzle. The waveform specifying signal dCom is a digital signal for specifying the waveform of the drive signal Com. The latch signal LAT and the change signal CNG are used together with the control signal SI and specify the timing of ejection of ink from the nozzle by specifying the drive timing of the drive element. The clock signal CLK serves as a reference clock that is in synchronization with the timing signal PTS.

The control circuit 12c described above includes one or more processors, for example, CPU (central processing unit). Instead of the CPU or in addition to the CPU, the control circuit 12c may include a programmable logic device, for example, FPGA (field-programmable gate array).

The drive signal generation circuit 12d is a circuit that generates the drive signal Com for driving each drive element of the head 5a of the head unit 5. Specifically, the drive signal generation circuit 12d includes, for example, a DA conversion circuit and an amplification circuit. In the drive signal generation circuit 12d, the DA conversion circuit converts the format of the waveform specifying signal dCom supplied from the control circuit 12c from a digital signal format into an analog signal format, and the amplification circuit amplifies the analog signal by using the power voltage VHV supplied from the power source circuit 12b, thereby generating the drive signal Com. A signal having, of the waveform included in the drive signal Com, a waveform supplied actually to the drive element serves as a drive pulse PD. The drive pulse PD is supplied from the drive signal generation circuit 12d to the drive element via the switch circuit 5d of the head unit 5. Based on the control signal SI, the switch circuit 5d switches whether or not to supply at least a part of the waveform included in the drive signal Com as the drive pulse PD.

The computer 13 has a function of supplying information such as the first print route data Db1 to the controller 11 and a function of supplying print data, etc. to the control module 12. The computer 13 will be described later in detail with reference to FIG. 5. The imaging device 7a described earlier may be connected to the controller 11 via the computer 13. In this case, the computer 13 may input the result of image capturing by the imaging device 7a into the controller 11 directly or, based on the result of image capturing by the imaging device 7a, calculate the position and orientation of the workpiece W and input information that indicates the calculation result into the controller 11. The calculation result may be used as data for correction DC, which is illustrated in FIG. 5 and will be described later.

1-3. Structure of First Robot

Figure 3:
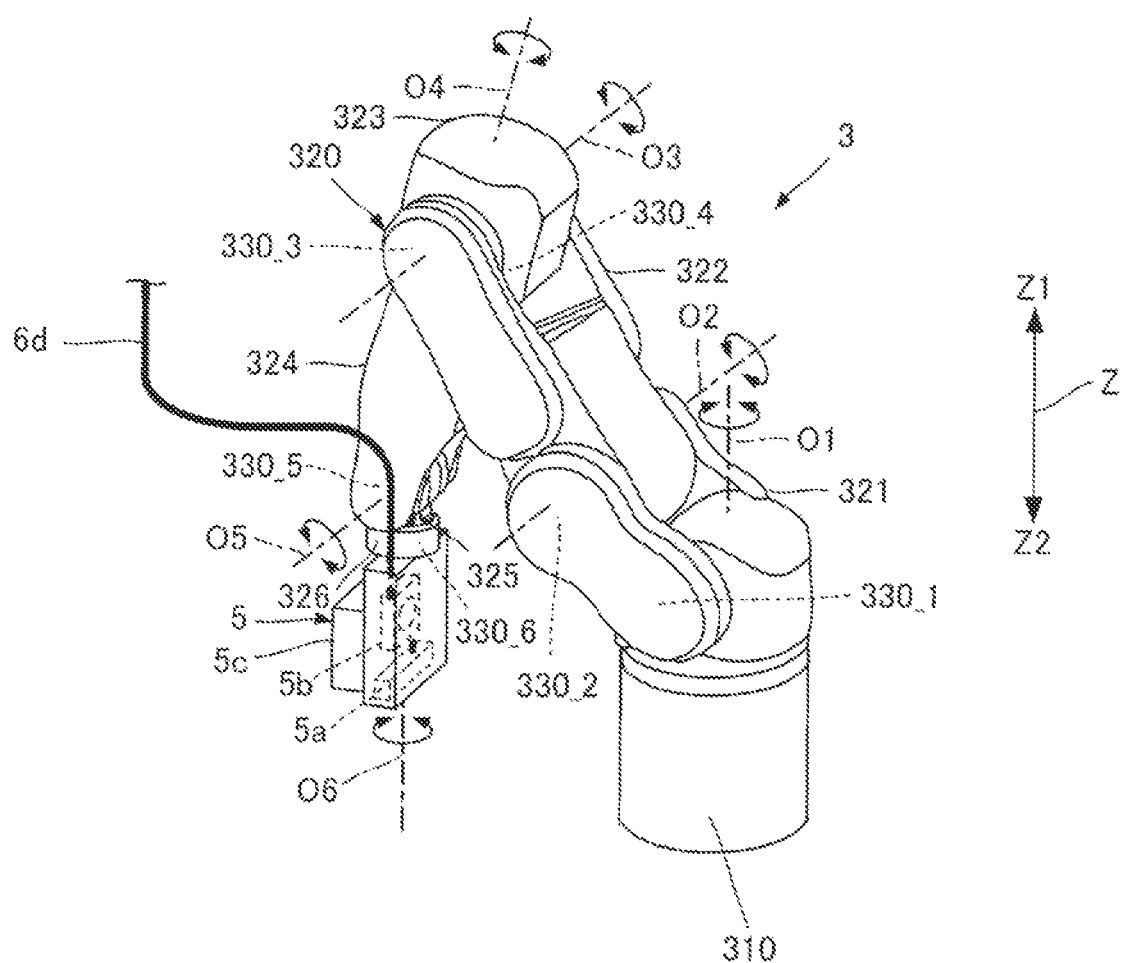
FIG. 3 is a perspective view of a first robot.

FIG. 3 is a perspective view of the first robot 3. The structure of the first robot 3 will now be explained. The structure of the second robot 4 is the same as the structure of the first robot 3 except that the end effector mounted on the second robot 4 is different from the end effector mounted on the first robot 3. Therefore, an explanation of the structure of the second robot 4 is omitted. However, as described earlier, the structure of the first robot 3 and the structure of the second robot 4 may be different from each other.

As illustrated in FIG. 3, the first robot 3 includes a pedestal portion 310 and an arm portion 320.

The pedestal portion 310 is a base column that supports the arm portion 320. In the example illustrated in FIG. 3, the pedestal portion 310 is fastened to the top 2a of the base 2 with screws, etc. in the Z direction.

The arm portion 320 is a six-axis robot arm module that has a base end mounted on the pedestal portion 310 and a distal end whose position and orientation are configured to change three-dimensionally in relation to the base end. Specifically, the arm portion 320 includes arms 321, 322, 323, 324, 325, and 326, which are coupled to one another sequentially in this order.

The arm 321 is coupled to the pedestal portion 310 via a joint 330_1 in such a way as to be able to rotate around a rotation axis O1. The arm 322 is coupled to the arm 321 via a joint 330_2 in such a way as to be able to rotate around a rotation axis O2. The arm 323 is coupled to the arm 322 via a joint 330_3 in such a way as to be able to rotate around a rotation axis O3. The arm 324 is coupled to the arm 323 via a joint 330_4 in such a way as to be able to rotate around a rotation axis O4. The arm 325 is coupled to the arm 324 via a joint 330_5 in such a way as to be able to rotate around a rotation axis O5. The arm 326 is coupled to the arm 325 via a joint 330_6 in such a way as to be able to rotate around a rotation axis O6.

Each of the joints 330_1 to 330_6 is a mechanism that couples, among the arms 321 to 326, one of two mutually-adjacent arms to the other in a rotatable manner. On each of the joints 330_1 to 330_6, a driving mechanism that causes one of the two mutually-adjacent arms to rotate in relation to the other is provided, though not illustrated in FIG. 3. The driving mechanism includes, for example, a motor that generates a driving force for the rotation, a speed reducer that performs speed reduction on the driving force and outputs the reduced force, and an encoder such as a rotary encoder that detects the amount of operation such as the angle of the rotation. The aggregate of the driving mechanisms provided respectively on the joints 330_1 to 330_6 corresponds to the arm driving mechanism 3a described earlier with reference to FIG. 2.

The rotation axis O1 is an axis that is perpendicular to the top 2a to which the pedestal portion 310 is fixed. The rotation axis O2 is an axis that is perpendicular to the rotation axis O1. The rotation axis O3 is an axis that is parallel to the rotation axis O2. The rotation axis O4 is an axis that is perpendicular to the rotation axis O3. The rotation axis O5 is an axis that is perpendicular to the rotation axis O4. The rotation axis O6 is an axis that is perpendicular to the rotation axis O5.

With regard to these rotation axes, the meaning of the word "perpendicular" is not limited to a case where the angle formed by two rotation axes is exactly 90°. In addition to such exact perpendicularity, the meaning of the word "perpendicular" encompasses cases where the angle formed by two rotation axes is within a range of approximately ±5° from 90°. Similarly, the meaning of the word "parallel" is not limited to a case where two rotation axes are exactly parallel to each other, but also encompasses cases where one of the two rotation axes is inclined with respect to the other within a range of approximately ±5°.

The head unit 5 is mounted as an end effector on, among the arms of the arm portion 320, the one that is located at the most distal end, that is, on the arm 326.

1-4. Structure of Head Unit

Figure 4:
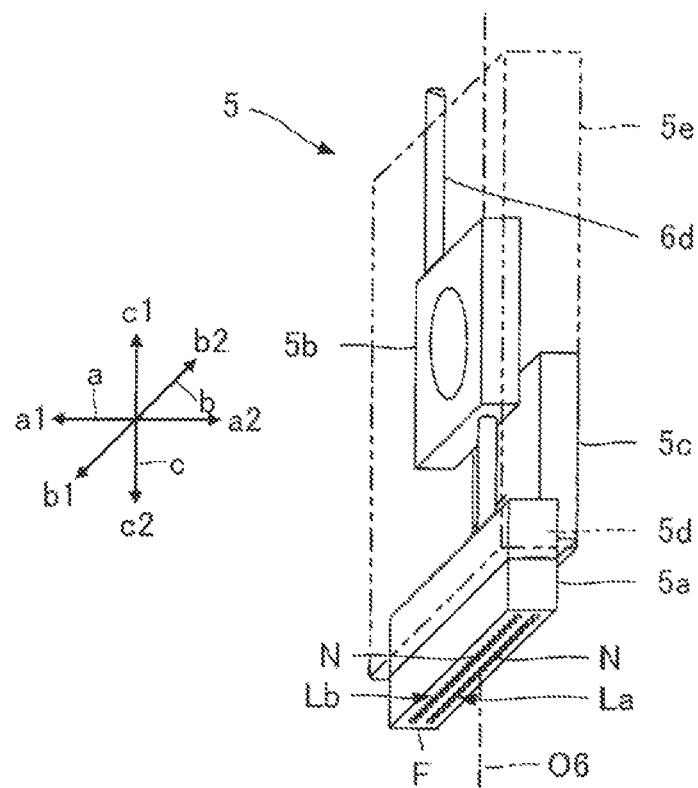
FIG. 4 is a perspective view showing a schematic structure of a head unit.

FIG. 4 is a perspective view showing a schematic structure of the head unit 5. To facilitate the readers' understanding, the description below will be given with reference to a, b, and c axes intersecting with one another. In the description below, one direction along the a axis will be referred to as the a1 direction, and the direction that is the opposite of the a1 direction will be referred to as the a2 direction. Similarly, directions that are the opposite of each other along the b axis will be referred to as the b1 direction and the b2 direction. Directions that are the opposite of each other along the c axis will be referred to as the c1 direction and the c2 direction.

The a, b, and c axes are coordinate axes of a tool coordinate system set for the head unit 5. The relative position and relative orientation of the a, b, and c axes with respect to the X, Y, and Z axes described earlier change due to the operation of the first robot 3 described earlier. In the example illustrated in FIG. 4, the c axis is parallel to the rotation axis O6 described earlier. The a, b, and c axes are typically orthogonal to one another, but are not limited thereto. For example, it is sufficient as long as the a, b, and c axes intersect with one another within an angular range of 80° or greater and 100° or less. The tool coordinate system is associated with the base coordinate system described earlier by calibration. The tool coordinate system is set such that, for example, its reference (tool center point) lies at the center of a nozzle face F that will be described later.

As described earlier, the head unit 5 includes the head 5a, the pressure adjustment valve 5b, and the curing light source 5c. These components are supported by a support member 5e indicated by alternate-long-and-two-short-dashes illustration in FIG. 4. In the example illustrated in FIG. 4, the head unit 5 has a single head 5a and a single pressure adjustment valve 5b. However, the number of each of them is not limited one. The head unit 5 may have two or more heads 5a and/or two or more pressure adjustment valves 5b. The position where the pressure adjustment valve 5b is provided is not limited to the arm 326. For example, the pressure adjustment valve 5b may be provided on any other arm, etc. The pressure adjustment valve 5b may be provided at a fixed position with respect to the pedestal portion 310.

The support member 5e is made of, for example, a metal material, and is substantially rigid. In FIG. 4, the support member 5e has a low-profile box-like shape. However, the support member 5e may have any shape, without being limited to the illustrated example.

The support member 5e described above is mounted on the arm 326 described earlier. As explained here, the head 5a, the pressure adjustment valve 5b, and the curing light source 5c are supported together by the support member 5e onto the arm 326. Therefore, the relative position of each of the head 5a, the pressure adjustment valve 5b, and the curing light source 5c in relation to the arm 326 is fixed.

The head 5a has a nozzle face F and a plurality of nozzles N formed in the nozzle face F. In the example illustrated in FIG. 4, the direction of a line normal to the nozzle face F is the c2 direction, and the plurality of nozzles N is made up of a first nozzle row La and a second nozzle row Lb, which are arranged next to each other, with an interval in the direction along the a axis therebetween. Each of the first nozzle row La and the second nozzle row Lb is a group of nozzles N arranged linearly in the direction along the b axis. The head 5a has a structure in which elements related to the respective nozzles N of the first nozzle row La and elements related to the respective nozzles N of the second nozzle row Lb are substantially symmetric to each other in the direction along the a axis. Under ideal conditions, a droplet of ink ejected from each of the nozzles N travels in air in the c2 direction. That is, the c2 direction is the direction in which ink is ejected.

The respective positions of the plurality of nozzles N of the first nozzle row La and the respective positions of the plurality of nozzles N of the second nozzle row Lb may be the same as each other or different from each other. Elements related to the respective nozzles N of either the first nozzle row La or the second nozzle row Lb may be omitted. In the example described below, it is assumed that the respective positions of the plurality of nozzles N of the first nozzle row La and the respective positions of the plurality of nozzles N of the second nozzle row Lb are the same as each other.

Though not illustrated, the head 5a has, for each of the nozzles N individually, a piezoelectric element, which is a drive element, and a cavity in which ink can be contained. Each of the plurality of piezoelectric elements changes the internal pressure of the cavity corresponding to the piezoelectric element, and, as a result of this pressure change, ink is ejected from the nozzle corresponding to this cavity. The head 5a described above can be manufactured by, for example, preparing a plurality of substrates such as silicon substrates processed using etching or the like and then bonding the substrates together by means of an adhesive. Instead of the piezoelectric element, a heater that heats ink inside the cavity may be used as a drive element for ejecting ink from the nozzle.

In the example illustrated in FIG. 4, the pressure adjustment valve 5b is located at a relatively c1-side position with respect to the head 5a. The curing light source 5c is located at a relatively a2-side position with respect to the head 5a.

The pressure adjustment valve 5b is connected to a non-illustrated ink tank via a supply tube 6d. The pressure adjustment valve 5b is a valve mechanism that opens and closes in accordance with the pressure of ink inside the head 5a. The opening and closing of this valve mechanism keeps the pressure of ink inside the head 5a within a predetermined negative pressure range even when a positional relationship between the head 5a and the ink tank changes. Keeping such negative ink pressure stabilizes ink meniscus formed in each nozzle N of the head 5a. Meniscus stability prevents external air from entering the nozzles N in the form of air bubbles and prevents ink from spilling out of the nozzles N. Ink flowing from the pressure adjustment valve 5b is distributed to a plurality of regions/positions in the head 5a via non-illustrated branch passages.

The curing light source 5c emits energy such as light, heat, an electron beam, or a radiation beam, etc. for curing or solidifying ink on the workpiece W. The curing light source 5c is configured as, for example, a light emitting element such as an LED (light emitting diode) that emits ultraviolet light. The curing light source 5c may include optical components such as lenses for adjusting the direction in which the energy is emitted, the range of energy emission, or the like. The curing light source 5c is not indispensable and thus may be omitted. The curing light source 5c may semi-solidify or semi-cure ink on the workpiece W, instead of complete solidification or complete curing. In this case, for example, the complete curing of ink on the workpiece W is performed by another curing light source provided separately.

1-5. Print Route Data

FIG. 5 is a diagram that illustrates the computer 13 used in a data generation method according to the first embodiment. In the present embodiment, the first print route data Db1 mentioned earlier is generated by the computer 13. As illustrated in FIG. 5, the computer 13 includes a display device 13d, an input device 13c, a storage circuit 13a, and a processing circuit 13b. These components are interconnected such that they are able to communicate with one another.

The display device 13d displays various images under the control of the processing circuit 13b. The display device 13d includes any of various display panels such as a liquid crystal display panel, an organic EL (electro-luminescence) display panel, etc. The display device 13d may be provided outside the computer 13. The display device 13d is not indispensable and thus may be omitted.

The input device 13c is a device that receives operations from a user. For example, the input device 13c includes a touch pad, a touch panel, or a pointing device such as a mouse. If the input device 13c includes a touch panel, it may double as the input device 13c and the display device 13d. The input device 13c may be provided outside the computer 13. The input device 13c is not indispensable and thus may be omitted.

The storage circuit 13a stores various programs that are to be run by the processing circuit 13b and various kinds of data that are to be processed by the processing circuit 13b. The storage circuit 13a includes, for example, a hard disk drive or a semiconductor memory. A part or a whole of the storage circuit 13a may be provided in an external storage device or a server, etc. outside the computer 13.

Workpiece coordinate system data Da, robot coordinate system data Db, a conversion parameter CP, and data for correction DC are stored in the storage circuit 13a.

The workpiece coordinate system data Da is a data group expressed in a workpiece coordinate system, which is a coordinate system set to have its reference on the workpiece W. The workpiece coordinate system data Da includes workpiece shape data DW, first initial route data Da1, and first reference route point data Ra1.

The workpiece shape data DW is data that represents in the workpiece coordinate system the shape of the workpiece W. The workpiece shape data DW is, for example, CAD (computer-aided design) data that represents the three-dimensional shape of the workpiece W. The first initial route data Da1 is data that represents in the workpiece coordinate system the route along which the head 5a should move. The first initial route data Da1 is generated based on the workpiece shape data DW as will be described later. The first reference route point data Ra1 is data that represents in the workpiece coordinate system the position and orientation of the head 5a at a specific point on the route along which the head 5a should move. The first reference route point data Ra1 is selected from among pieces of data included in the first initial route data Da1 as will be described later. The first initial route data Da1 will be described later in detail with reference to FIG. 6.

The robot coordinate system data Db is a data group expressed in a robot coordinate system, which is a coordinate system set to have its reference on the robot 10. The robot coordinate system data Db includes the first print route data Db1, first head reference point data Rb1, and robot space data DR.

The first print route data Db1 is data that represents in the robot coordinate system the route along which the head 5a should move. The first print route data Db1 is generated by converting the first initial route data Da1 using the conversion parameter CP as will be described later. The first head reference point data Rb1 is data that represents in the robot coordinate system the position and orientation of the head 5a. The first head reference point data Rb1 is generated based on, for example, the robot space data DR. The robot space data DR is data that represents in the robot coordinate system possible position and possible orientation of the head 5a. The robot space data DR is generated based on, for example, the size and shape of the head unit 5, the operable range of the first robot 3, the position and size of an obstacle(s) present in the operable range, etc. The first print route data Db1 will be described later in detail with reference to FIG. 6.

The conversion parameter CP is a parameter for converting coordinate values in the workpiece coordinate system into coordinate values in the robot coordinate system. The conversion parameter CP represents correspondence between the first reference route point data Ra1 and the first head reference point data Rb1. The conversion parameter CP is calculated using the result of comparison of the coordinate value indicated by the first reference route point data Ra1 and the coordinate value indicated by the first head reference point data Rb1 as will be described later.

The data for correction DC is calibration data for correcting the first print route data Db1. The data for correction DC represents in the robot coordinate system the position and orientation of the workpiece W or the head 5a. The data for correction DC is generated based on, for example, the result of image capturing by the imaging unit 7.

The processing circuit 13b is a circuit that has a function of controlling the components, etc. of the computer 13 and a function of processing various kinds of data. The processing circuit 13b includes, for example, a processor such as a CPU. The processing circuit 13b may be comprised of a single processor or a plurality of processors. A part or a whole of the functions of the processing circuit 13b may be embodied by hardware such as DSP, ASIC, PLD, FPGA, or the like.

The processing circuit 13b implements various functions by reading programs out of the storage circuit 13a and running the programs. Specifically, based on the workpiece shape data DW, the processing circuit 13b acquires or generates the data described above, etc.

Figure 6:
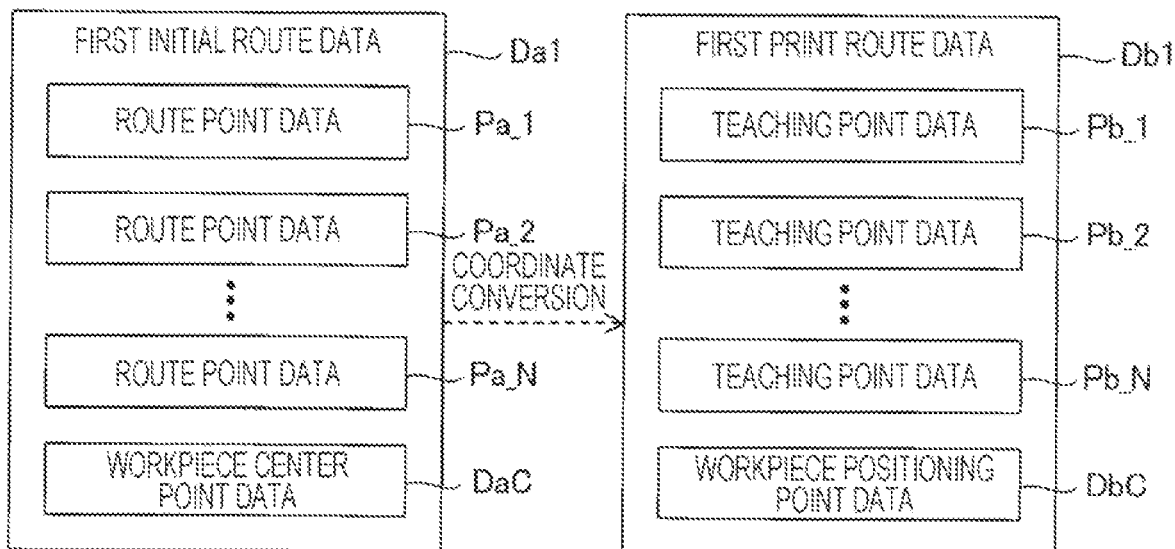
FIG. 6 is a diagram for explaining first initial route data and first print route data.

FIG. 6 is a diagram for explaining the first initial route data Da1 and the first print route data Db1. In the present embodiment, the first initial route data Da1 includes N pieces of route point data Pa_1 to Pa_N and workpiece center point data DaC. In the description below, when no distinction is made between the N pieces of route point data Pa_1 to Pa_N, each of them may be referred to as route point data Pa. It is not essential that the first initial route data Da1 should include the workpiece center point data DaC. The workpiece center point data DaC may be configured as discrete data separated from the first initial route data Da1.

The N pieces of route point data Pa_1 to Pa_N are data that represent in the workpiece coordinate system the position and orientation of the head 5a at points different from one another on the route along which the head 5a should move, where N is a natural number equal to or greater than 2. The first reference route point data Ra1 described above is one, denoted as Pa, of the N pieces of route point data Pa_1 to Pa_N. This one, Pa, of the route point data is, for example, selected by a user from among the N pieces of route point data Pa_1 to Pa_N.

The workpiece center point data DaC is data that represents in the workpiece coordinate system the position and orientation of the workpiece W. The workpiece center point data DaC is, for example, center point data included in the workpiece shape data DW.

In the present embodiment, the first print route data Db1 includes N pieces of teaching point data Pb_1 to Pb_N and workpiece positioning point data DbC. In the description below, when no distinction is made between the N pieces of teaching point data Pb_1 to Pb_N, each of them may be referred to as teaching point data Pb. It is not essential that the first print route data Db1 should include the workpiece positioning point data DbC The workpiece positioning point data DbC may be configured as discrete data separated from the first print route data Db1.

The N pieces of teaching point data Pb_1 to Pb_N are data that represent in the robot coordinate system the position and orientation of the head 5a at points different from one another on the route along which the head 5a should move, where N is a natural number equal to or greater than 2. The N pieces of teaching point data Pb_1 to Pb_N is data obtained by converting the N pieces of route point data Pa_1 to Pa_N from coordinate values in the workpiece coordinate system into coordinate values in the robot coordinate system using the conversion parameter CP. There is one-to-one correspondence between the N pieces of route point data Pa_1 to Pa_N and the N pieces of teaching point data Pb_1 to Pb_N.

The workpiece positioning point data DbC is data obtained by converting the workpiece center point data DaC described above from a coordinate value in the workpiece coordinate system into a coordinate value in the robot coordinate system using the conversion parameter CP. The workpiece positioning point data DbC included in the first print route data Db1 is an example of "first workpiece positioning point data".

1-6. Operation of Three-Dimensional Object Printing Apparatus

Figure 7:
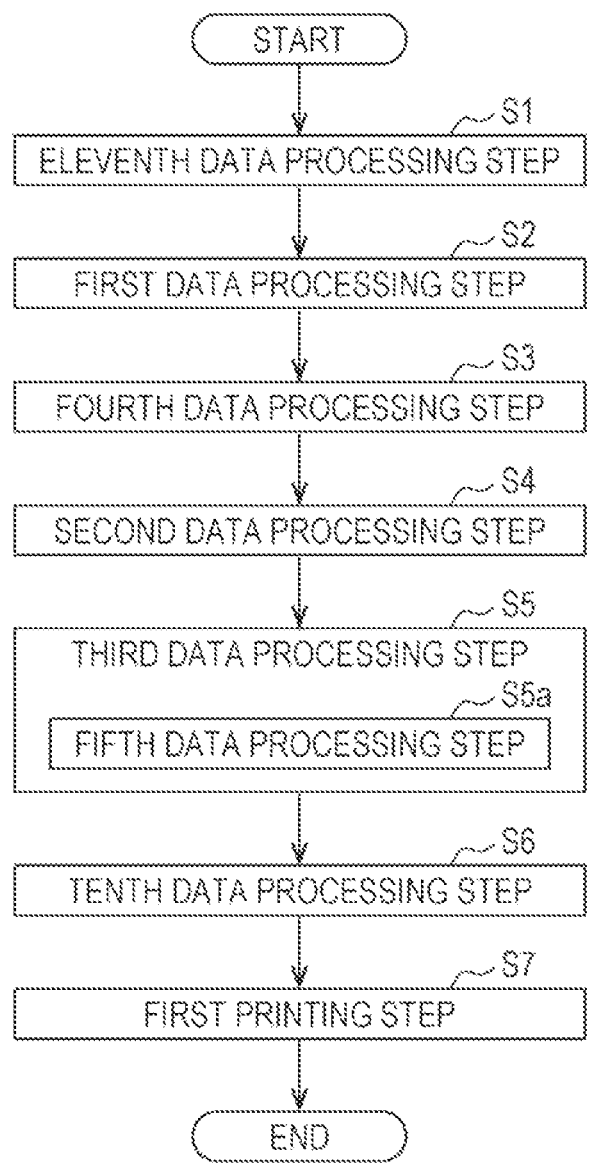
FIG. 7 is a flowchart that illustrates the three-dimensional object printing method according to the first embodiment.

FIG. 7 is a flowchart that illustrates the three-dimensional object printing method according to the first embodiment. The three-dimensional object printing apparatus 1 described above executes the three-dimensional object printing method for printing on the workpiece W using the head 5a and the robot 10 described earlier. The three-dimensional object printing method includes, as illustrated in FIG. 7, an eleventh data processing step S1, a first data processing step S2, a fourth data processing step S3, a second data processing step S4, a third data processing step S5, a tenth data processing step S6, and a first printing step S7. In the present embodiment, the third data processing step S5 includes a fifth data processing step S5a.

In the eleventh data processing step S1, the pieces of route point data Pa and the workpiece center point data DaC described earlier are generated. That is, in the eleventh data processing step S1, the first initial route data Da1 is generated. In the first data processing step S2, the first initial route data Da1 is acquired. In the fourth data processing step S3, the first reference route point data Ra1 is acquired. In the second data processing step S4, the first head reference point data Rb1 is acquired. In the third data processing step S5, the first print route data Db1 is generated. In the fifth data processing step S5a, the workpiece positioning point data DbC is generated. In the tenth data processing step S6, the first print route data Db1 is corrected. In the first printing step S7, printing is performed based on the first print route data Db1.

In the example illustrated in FIG. 7, the eleventh data processing step S1, the first data processing step S2, the fourth data processing step S3, the second data processing step S4, the third data processing step S5 including the fifth data processing step S5a, the tenth data processing step S6, and the first printing step S7 are executed in this order. These steps will now be explained in detail.

Figure 8:
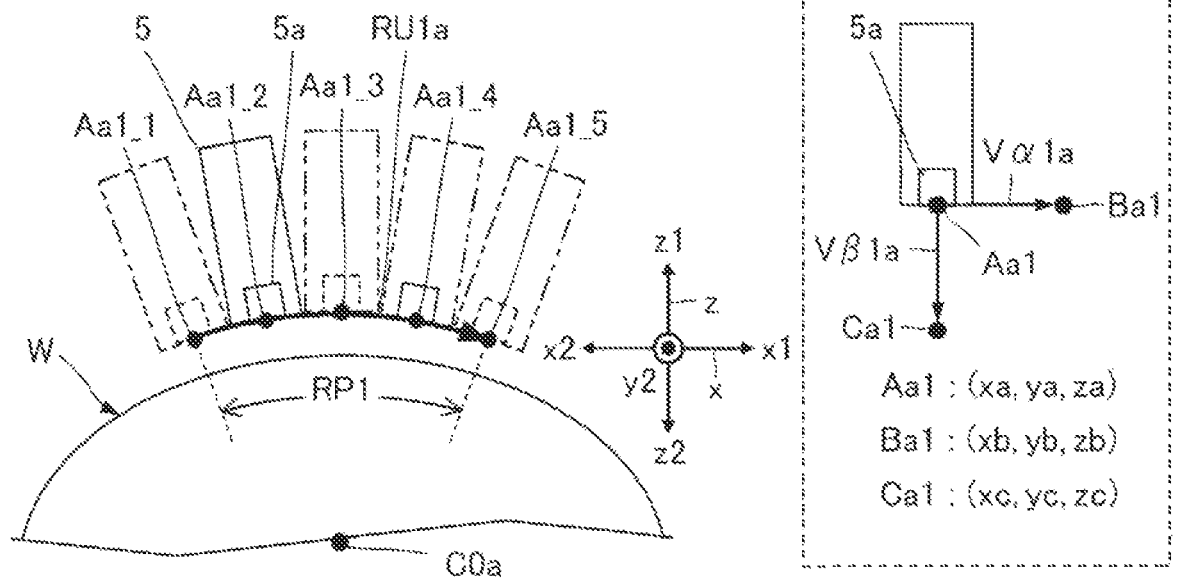
FIG. 8 is a diagram for explaining the acquisition of the first initial route data.

FIG. 8 is a diagram for explaining the generation of the first initial route data Da1 in the eleventh data processing step S1, the acquisition of the first initial route data Da1 in the first data processing step S2, and the acquisition of the first reference route point data Ra1 in the fourth data processing step S3. FIG. 8 illustrates a route RU1*a* along which the head 5*a* should move when printing is performed on a first region RP1 of the workpiece W in a space in the workpiece coordinate system having, as its coordinate axes, x, y, and z axes that are orthogonal to one another.

As illustrated in FIG. 8, the shape of the workpiece W and the center point C0*a* of the workpiece W are included in the workpiece shape data DW described earlier as coordinate values in the workpiece coordinate system. In the eleventh data processing step S1 described earlier, the pieces of route point data Pa described earlier are generated based on the coordinate values representing the shape in the workpiece shape data DW, and the workpiece center point data DaC is generated based on the coordinate value representing the center point C0*a* in the workpiece shape data DW.

The generation of the pieces of route point data Pa is performed using, for example, an automatic route generation algorithm. For example, the route RU1*a* that extends linearly as viewed in the direction along the Z axis or the X axis is set in such a way as to make the distance between the head 5*a* and the first region RP1 constant.

In the example illustrated in FIG. 8, the route RU1*a* is a trajectory path going through five route points Aa1_1 to Aa1_5 in this order. In the description below, when no distinction is made between the five route points Aa1_1 to Aa1_5, each of them may be referred to as route point Aa1.

The route point Aa1 is a point indicated by the route point data Pa included in the first initial route data Da1 described earlier. The position of the head 5*a* is expressed in terms of the coordinate value of the route point Aa1 in the workpiece coordinate system. The orientation of the head 5*a* is expressed in terms of the angle of rotation around each coordinate axis in the workpiece coordinate system.

One route point Aa1 selected from among these route points Aa1_1 to Aa1_5 is the point indicated by the first reference route point data Ra1 described earlier. In the example illustrated in FIG. 8, the route point Aa1_2 is the point indicated by the first reference route point data Ra1. In FIG. 8, the head 5*a* and the head unit 5 corresponding to the route point Aa1_2 are indicated by solid-line illustration, and the head 5*a* and the head unit 5 corresponding to the other route points Aa1_1 and Aa1_3 to Aa1_5 are indicated by alternate-long-and-two-short-dashes illustration.

As will be understood from the above description, in the first data processing step S2 described earlier, the pieces of route point data Pa and the workpiece center point data DaC generated in the eleventh data processing step S1 are acquired as the first initial route data Da1.

Then, in the fourth data processing step S3, a piece of route point data Pa is selected from among the pieces of route point data Pa, thereby acquiring this selected one Pa as the first reference route point data Ra1.

Figure 9:
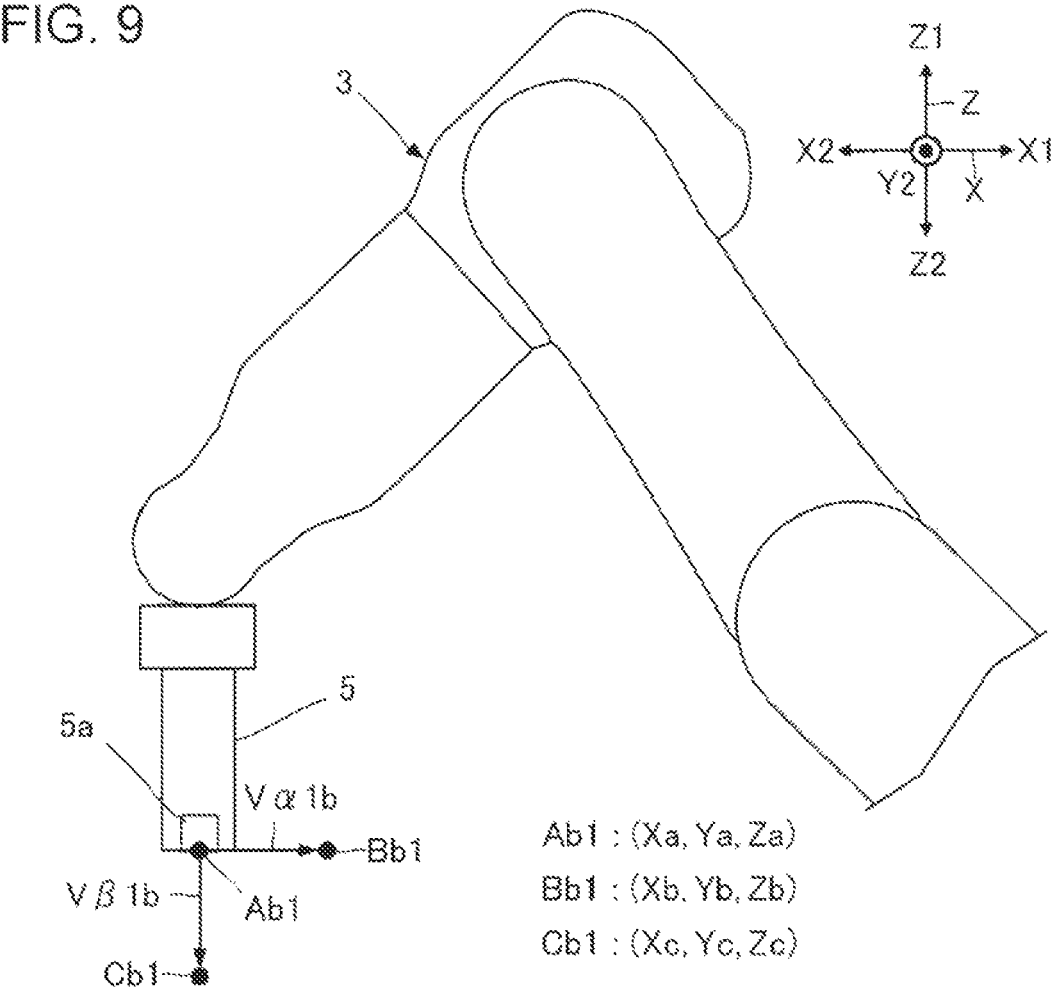
FIG. 9 is a diagram for explaining the acquisition of first head reference point data.

FIG. 9 is a diagram for explaining the acquisition of the first head reference point data Rb1 in the second data processing step S4. FIG. 9 illustrates the position and orientation of the head 5*a* in a space in the robot coordinate system based on the first head reference point data Rb1. This position and this orientation are determined using the robot space data DR, etc. from possible position and possible orientation of the head 5*a*. For example, a user is able to choose the first head reference point data Rb1 out of the robot space data DR and make an adjustment. In this way, in the second data processing step S4, the first head reference point data Rb1 is acquired.

Figure 10:
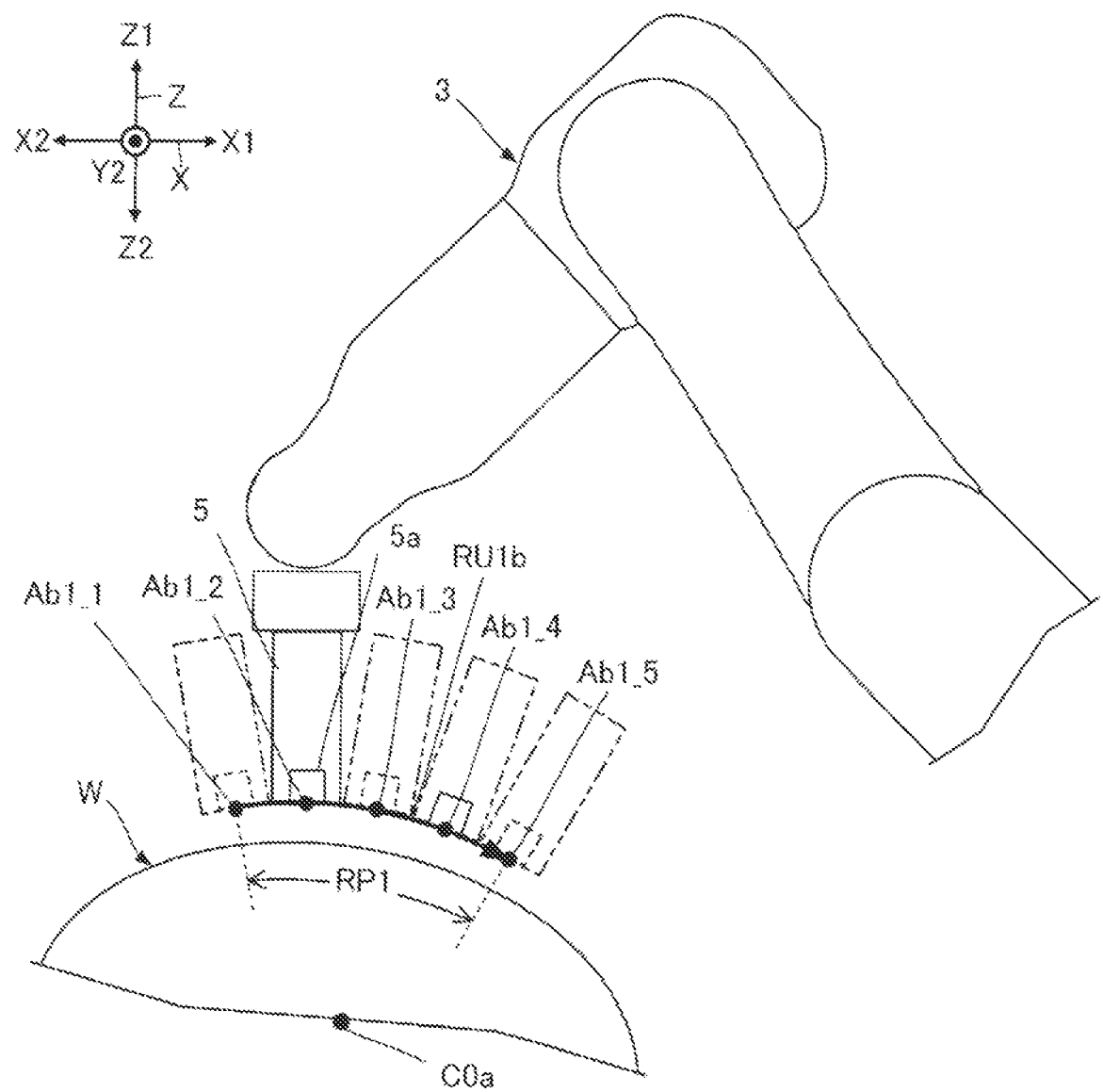
FIG. 10 is a diagram for explaining the generation of the first print route data.

With reference to FIGS. 8, 9, and 10, an example of a method for acquiring the conversion parameter CP, and the generation of the first print route data Db1 in the third data processing step S5, will now be explained.

In the present embodiment, assuming that the coordinate value of the route point Aa1 selected as the first reference route point data Ra1 in the workpiece coordinate system is (xa, ya, za), the coordinate values of other two points Ba1 and Ca1 in the workpiece coordinate system are acquired together with the coordinate value of the route point Aa1. These three points, namely, the route point Aa1 and the points Ba1 and Ca1, are points whose positions are different from one another and, as such, are not on the same straight line.

For example, as shown in the broken-line box in FIG. 8, the point Ba1 is a point located ahead of the route point Aa1 selected as the first reference route point data Ra1 in the direction in which the head 5*a* moves, and the coordinate value (xb, yb, zb) of the point Ba1 is a coordinate value obtained by adding a moving-directional vector V$\alpha$1*a* to the coordinate value (xa, ya, za) of the route point Aa1 selected as the first reference route point data Ra1. The point Ca1 is a point located away from the route point Aa1 in the direction in which the head 5*a* ejects ink, and the coordinate value (xc, yc, zc) of the point Ca1 is a coordinate value obtained by adding an ejecting-directional vector V$\beta$1*a* to the coordinate value (xa, ya, za) of the route point Aa1.

In the present embodiment, assuming that the coordinate value of a point Ab1 selected as the first head reference point data Rb1 in the robot coordinate system is (Xa, Ya, Za), the coordinate values of other two points Bb1 and Cb1 in the robot coordinate system are acquired together with the coordinate value of the point Ab1. These three points, namely, the route point Ab1 and the points Bb1 and Cb1, are points whose positions are different from one another and, as such, are not on the same straight line. They correspond to the above-mentioned three points, namely, the route point Aa1 and the points Ba1 and Ca1 in the workpiece coordinate system.

For example, as illustrated in FIG. 9, the point Bb1 is a point located ahead of the point Ab1 in the direction in which the head 5*a* moves, and the coordinate value (Xb, Yb, Zb) of the point Bb1 is a coordinate value obtained by adding a moving-directional vector V$\alpha$1*b* to the coordinate value (Xa, Ya, Za) of the point Ab1. The point Cb1 is a point located away from the point Ab1 in the direction in which the head 5*a* ejects ink, and the coordinate value (Xc, Yc, Zc) of the point Cb1 is a coordinate value obtained by adding an ejecting-directional vector V$\beta$1*b* to the coordinate value of the point Ab1. The vector V$\alpha$1*a* and the vector V$\alpha$1*b* are equal to each other in term of direction and magnitude with respect to the head 5*a*. The vector V$\beta$1*a* and the vector V$\beta$1*b* are equal to each other in term of direction and magnitude with respect to the head 5*a*. It is preferable if the vector V$\alpha$1*a*, the vector V$\beta$1*a*, the vector V$\alpha$1*b*, and the vector V$\beta$1*b* have been set in advance in such a way as to satisfy these conditions.

FIG. 10 is a diagram for explaining the generation of the first print route data Db1. FIG. 10 illustrates a route RU1*b* along which the head 5*a* should move when printing is performed on the first region RP1 of the workpiece W in a space in the robot coordinate system.

In the third data processing step S5, first, the points Ab1, Bb1, and Cb1, which are coordinate values based on the first head reference point data Rb1, are compared with the route point Aa1 and the points Ba1 and Ca1, which are three coordinate values based on the first reference route point data Ra1, respectively. Then, a computation is performed for estimating such a conversion parameter CP that makes them agree or minimizes the error. The conversion parameter CP can be obtained as a result of this computation. A known method, for example, the least squares method, can be used for this computation.

After the conversion parameter CP is obtained, the first print route data Db1 is generated by applying the conversion parameter CP to the pieces of route point data Pa included in the first initial route data Da1.

In the present embodiment, the third data processing step S5 includes the fifth data processing step S5a, and, in the fifth data processing step S5a, the workpiece positioning point data DbC is generated by applying the conversion parameter CP to the workpiece center point data DaC.

After the third data processing step S5 described above, in the tenth data processing step S6, the first print route data Db1 is corrected based on the result of detecting the position where the workpiece W is actually positioned based on the result of image capturing by the imaging unit 7, etc. The corrected first print route data Db1, which is an example of corrected first print route data, is obtained in this way.

Figure 11:
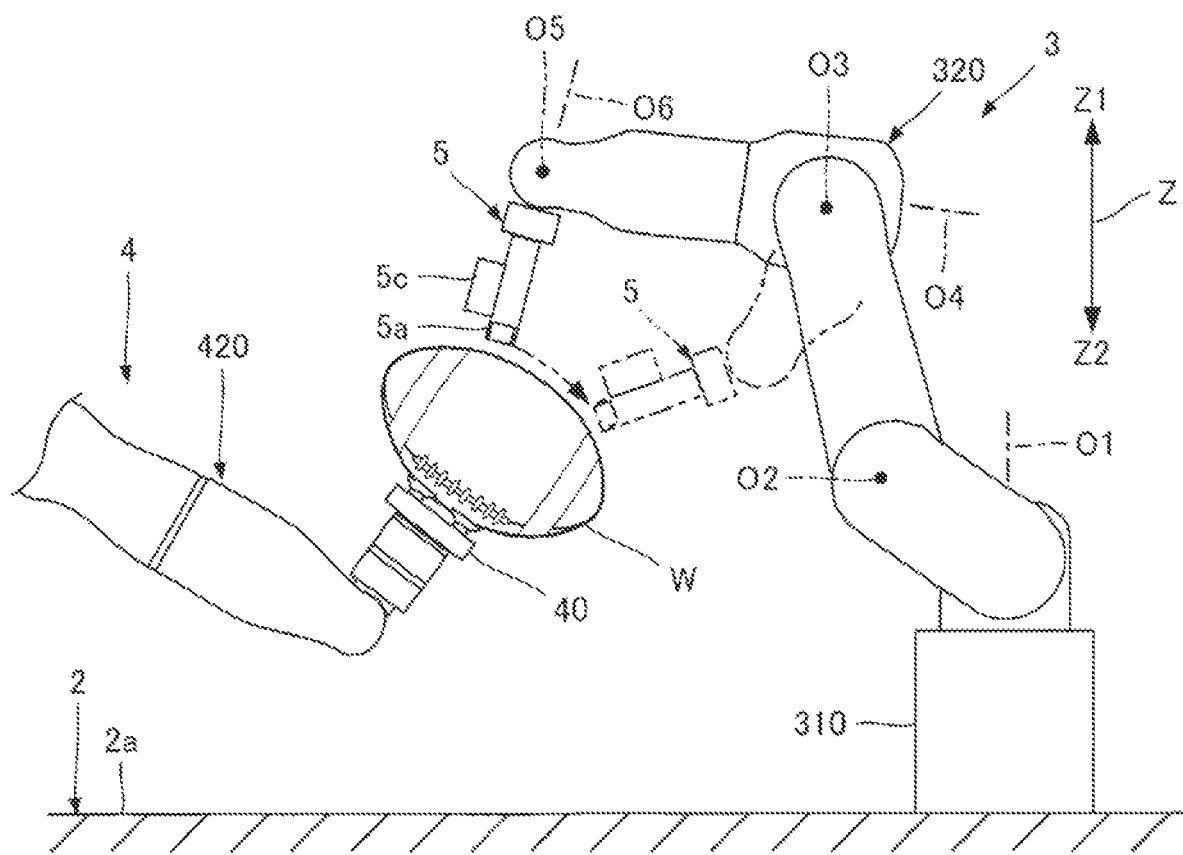
FIG. 11 is a diagram for explaining the operation of the first robot in a first printing step.

FIG. 11 is a diagram for explaining the operation of the first robot 3 in the first printing step S7. In the first printing step S7, as illustrated in FIG. 11, in a state in which the second robot 4 keeps the position and orientation of the workpiece W, the head 5a ejects ink onto the workpiece W while the first robot 3 moves the head 5a.

The first robot 3 moves the head 5a based on the pieces of teaching point data Pb included in the first print route data Db1. Prior to the first printing step S7, the second robot 4 positions the workpiece W based on the workpiece positioning point data DbC included in the first print route data Db1.

As explained above, in this step, the first robot 3 operates, and the second robot 4 is kept stationary. Therefore, it is possible to prevent vibrations of the workpiece W from occurring. In order to reduce the meandering of the movement path of the head 5a, preferably, the number of joints of the first robot 3 that operate in this step should be as small as possible; in addition, preferably, the first robot 3 should be operated by articulated operation of three rotation axes that are parallel to one another. In the example illustrated in FIG. 11, these three rotation axes are the rotation axes O2, O3, and O5.

In the three-dimensional object printing method described above, the head 5a configured to eject ink, which is an example of "a liquid", onto the workpiece W and the robot 10 configured to change relative position and relative orientation of the workpiece W and the head 5a are used. As described earlier, the three-dimensional object printing method includes the first data processing step S2, the second data processing step S4, the third data processing step S5, and the first printing step S7.

In the first data processing step S2, the first initial route data Da1 that represents in the workpiece coordinate system the route along which the head 5a is to move is acquired. In the second data processing step S4, the first head reference point data Rb1 that represents in the robot coordinate system the position and orientation of the head 5a is acquired. In the third data processing step S5, based on the first initial route data Da1 and the first head reference point data Rb1, the first print route data Db1 that represents in the robot coordinate system the route along which the head 5a is to move is generated. In the first printing step S7, ink is ejected from the head 5a onto the workpiece W while the robot 10 is operated based on the first print route data Db1.

The data generation method of generating data in the robot coordinate system from data in the workpiece coordinate system includes the first data processing step S2, which is an example of "a first step", the second data processing step S4, which is an example of "a second step", and the third data processing step S5, which is an example of "a third step". In the first data processing step S2, as an example of "initial route data", the first initial route data Da1 that represents in the workpiece coordinate system the route along which the end effector including the head 5a is to move is acquired. In the second data processing step S4, as an example of "reference teaching point data", the first head reference point data Rb1 that represents in the robot coordinate system the position and orientation of the end effector is acquired. In the third data processing step S5, based on the initial route data and the reference teaching point data, as an example of "teaching data", the first print route data Db1 that represents in the robot coordinate system the route along which the end effector is to move is generated.

In the three-dimensional object printing method described above, the first print route data Db1 is generated based on the first initial route data Da1 and the first head reference point data Rb1. Therefore, when the route along which the head 5a should move in a real space needs to be changed in accordance with a change in the positioning of the workpiece W, etc., the only thing that needs to be done is to change the first head reference point data Rb1. Therefore, it is possible to generate the first print route data Db1 again easily. For example, when an adjustment for moving the position of the route RU1b as a whole in the Z1 direction is needed, moving the coordinate of the first head reference point data Rb1 in the Z1 direction suffices. Similarly, when an adjustment for changing the orientation of the route RU1b as a whole is needed, changing the orientation of the first head reference point data Rb1 suffices.

By contrast, in a method according to related art, in which the first print route data Db1 is generated without using the first initial route data Da1, when the route along which the head 5a should move needs to be changed in accordance with a change in the positioning of the workpiece W, etc., the user has to actually move the robot 10 each time and specify three or more target points on the route after the change as coordinate values in the robot coordinate system. For this reason, a method according to related art is disadvantageous in that it takes a lot of trouble to generate the first print route data Db1 again.

When the workpiece W is a three-dimensional object, there could be a wide variety of shapes of the workpiece W. Therefore, the route along which the head 5a should move needs to be changed frequently in accordance with changes in the positioning of the workpiece W. Therefore, making it possible to change the route along which the head 5a should move just by changing the first head reference point data Rb1 will be very advantageous. Examples of cases where the route along which the head 5a should move needs to be changed are: avoiding a possible risk of collision with an obstacle which might otherwise occur during the operation of the robot 10, avoiding stressful orientation of the robot 10, and so forth.

As described earlier, the robot 10 includes the first robot 3 configured to change the position and orientation of the head 5a and the second robot 4 configured to change the position and orientation of the workpiece W. Then, in the first printing step S7, the first robot 3 moves the head 5a based on the first print route data Db1. In a configuration in which two robots are used as in the embodiment described above, it is possible to change the positioned status of the workpiece W by the operation of the second robot 4 easily. Moreover, it is possible to cause the head 5a to move along the route based on the first print route data Db1 by the operation of the first robot 3.

As described earlier, the first initial route data Da1 includes the pieces of route point data Pa that represent in the workpiece coordinate system the position and orientation of the head 5a. The fourth data processing step S3 is included between the first data processing step S2 and the third data processing step S5. In the fourth data processing step S3, a particular piece of route point data Pa is selectively acquired as the first reference route point data Ra1 from among the pieces of route point data Pa included in the first initial route data Da1. Then, in the third data processing step S5, the first print route data Db1 is generated based on the first reference route point data Ra1 and the first head reference point data Rb1. As described above, by using the first reference route point data Ra1, it is possible to associate a coordinate value in the workpiece coordinate system with a coordinate value in the robot coordinate system. Moreover, by using this association, it is possible to generate the first print route data Db1 based on the pieces of route point data Pa included in the first initial route data Da1.

Specifically, as described earlier, in the third data processing step S5, the conversion parameter CP is calculated, and the first print route data Db1 is generated by applying the conversion parameter CP to the pieces of route point data Pa included in the first initial route data Da1. The conversion parameter CP is a parameter that represents correspondence between the first reference route point data Ra1 and the first head reference point data Rb1. The conversion parameter CP is calculated by comparing the coordinate value indicated by the first reference route point data Ra1 with the coordinate value indicated by the first head reference point data Rb1.

As described earlier, the first initial route data Da1 further includes the workpiece center point data DaC that represents in the workpiece coordinate system the position and orientation of the workpiece W. The fifth data processing step S5a is included between the second data processing step S4 and the first printing step S7. In the fifth data processing step S5a, based on the first initial route data Da1 and the workpiece center point data DaC and the first head reference point data Rb1, the workpiece positioning point data DbC that represents in the robot coordinate system the position at which the workpiece W is to be positioned and the orientation in which the workpiece W is to be positioned is generated as an example of first workpiece positioning point data. Therefore, as described earlier, in the first printing step S7, the second robot 4 positions the workpiece W based on the workpiece positioning point data DbC.

As described earlier, the tenth data processing step S6 is included between the third data processing step S5 and the first printing step S7. In the tenth data processing step S6, based on the result of detecting the position where the workpiece W is actually positioned and the first print route data Db1, the corrected first print route data Db1 is generated as an example of corrected first print route data. Therefore, it is possible to enhance the precision of the first print route data Db1.

As described earlier, the eleventh data processing step S1 is included prior to the first data processing step S2. In the eleventh data processing step S1, the pieces of route point data Pa and the workpiece center point data DaC are generated based on the workpiece shape data DW that represents in the workpiece coordinate system the shape of the workpiece W.

2. Second Embodiment

A second embodiment of the present disclosure will now be explained. In the exemplary embodiment described below, the same reference numerals as those used in the description of the first embodiment are assigned to elements that are the same in operation and/or function as those in the first embodiment, and a detailed explanation of them is omitted.

Figure 12:
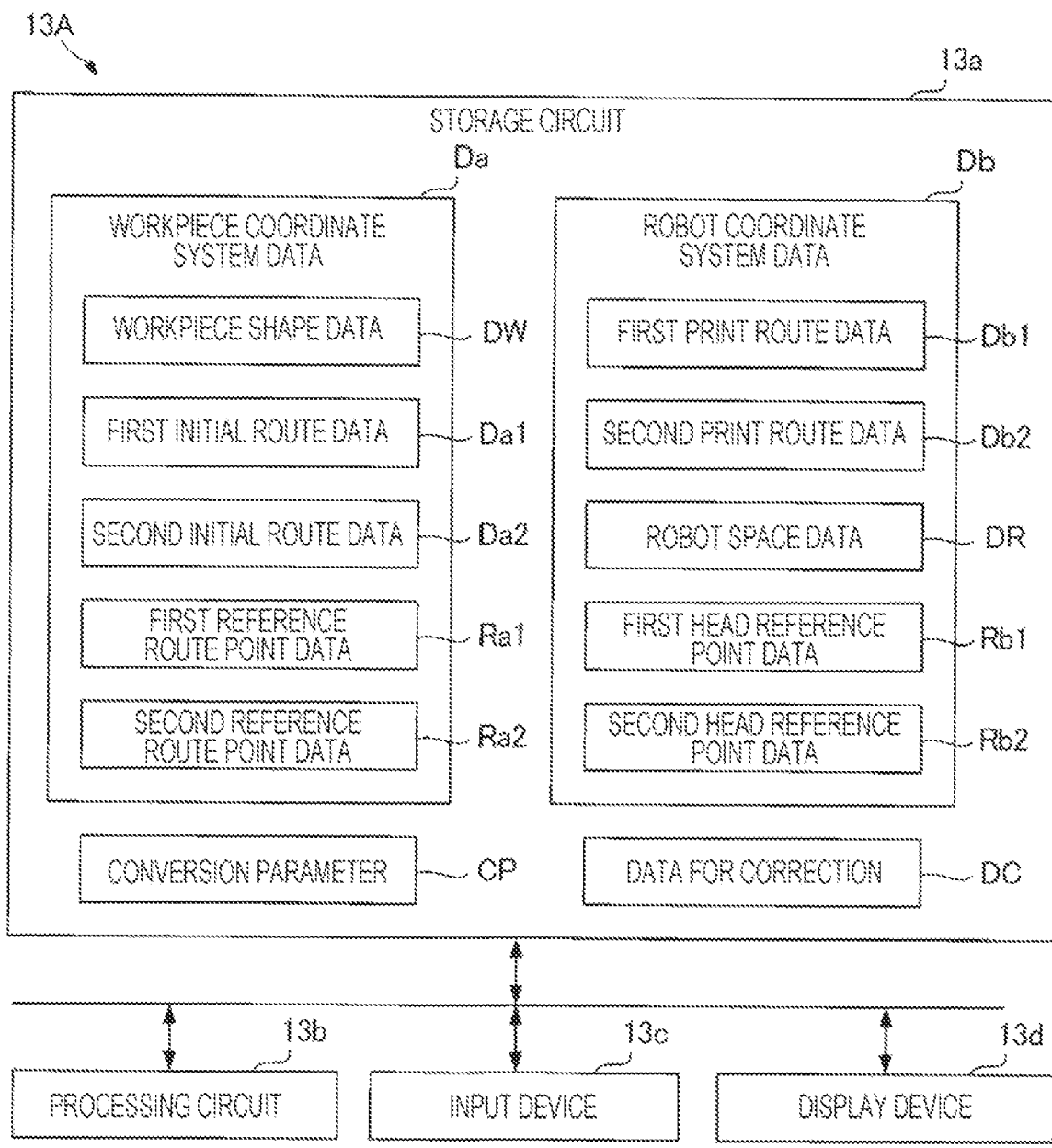
FIG. 12 is a diagram that illustrates a computer used in a data generation method according to a second embodiment.

FIG. 12 is a diagram that illustrates a computer 13A used in a data generation method according to a second embodiment. Besides the first print route data Db1, the computer 13A generates a second print route data Db2. The computer 13A is the same as the computer 13 according to the first embodiment described earlier except that data and programs stored in the storage circuit 13a are different from those of the foregoing counterpart.

The workpiece coordinate system data Da according to the present embodiment includes second initial route data Da2 and second reference route point data Ra2 in addition to the data described in the first embodiment.

The second initial route data Da2 is data that represents, in the workpiece coordinate system, as the route along which the head 5a should move, a route that is different from that of the first initial route data Da1. The second initial route data Da2 is generated based on the workpiece shape data DW similarly to the first initial route data Da1. The second reference route point data Ra2 is data that represents in the workpiece coordinate system the position and orientation of the head 5a at a specific point on the route along which the head 5a should move. The second reference route point data Ra2 is generated based on the second initial route data Da2.

The robot coordinate system data Db according to the present embodiment includes second print route data Db2 and second head reference point data Rb2 in addition to the data described in the first embodiment.

The second print route data Db2 is data that represents, in the robot coordinate system, as the route along which the head 5a should move, a route that is different from that of the first print route data Db1. The second print route data Db2 is generated by converting the second initial route data Da2 using the conversion parameter CP. The second head reference point data Rb2 is data that represents in the robot coordinate system the position and orientation of the head 5a. The second head reference point data Rb2 is generated based on, for example, the robot space data DR similarly to the first head reference point data Rb1.

Figure 13:
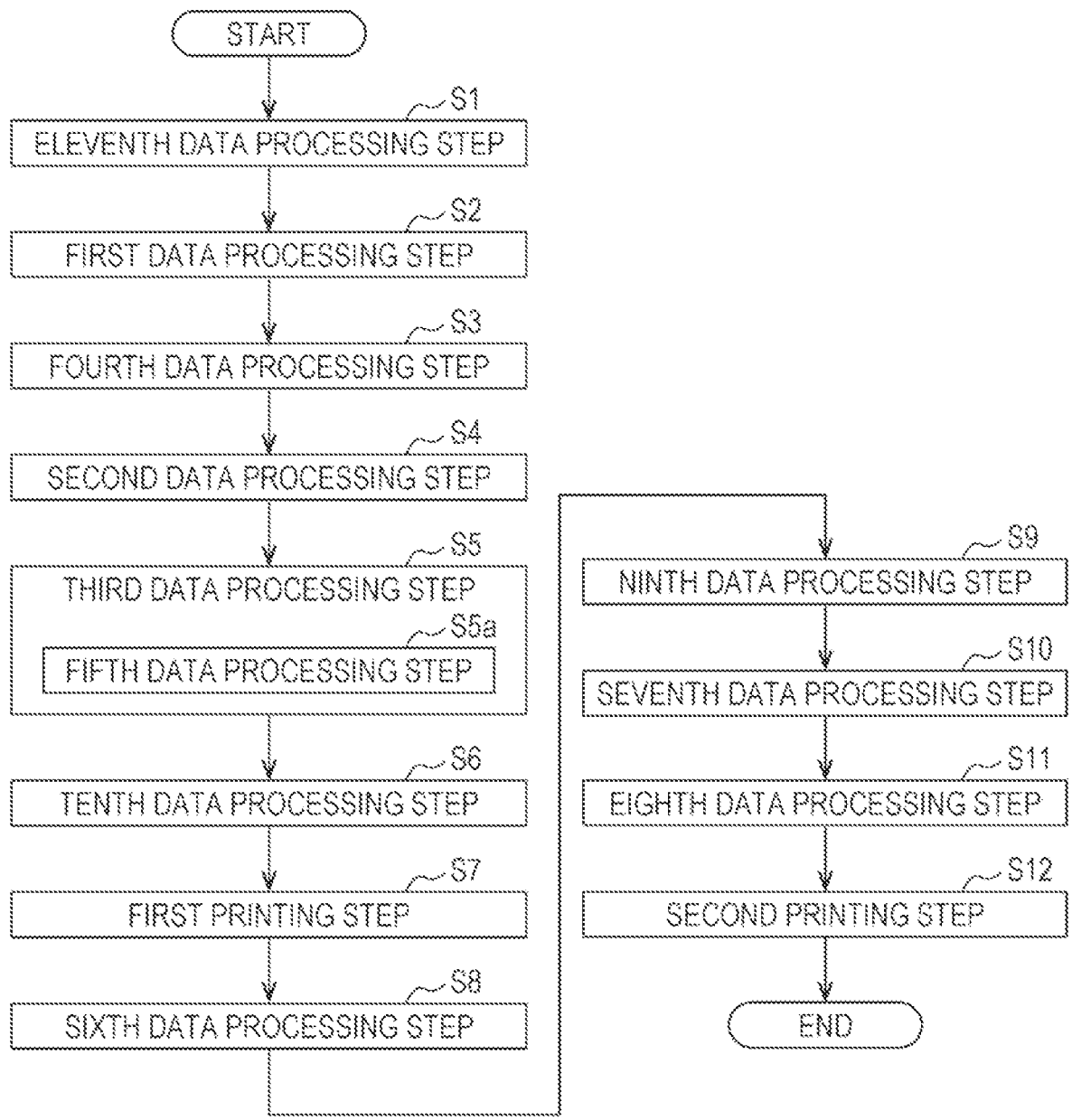
FIG. 13 is a flowchart that illustrates a three-dimensional object printing method according to the second embodiment.

FIG. 13 is a flowchart that illustrates the three-dimensional object printing method according to the second embodiment. As illustrated in FIG. 13, the three-dimensional object printing method according to the present embodiment includes a sixth data processing step S8, a ninth data processing step S9, a seventh data processing step S10, an eighth data processing step S11, and a second printing step S12 in addition to the steps described earlier in the first embodiment.

In the sixth data processing step S8, the second initial route data Da2 is acquired. In the ninth data processing step S9, the second reference route point data Ra2 is acquired. In the seventh data processing step S10, the second head reference point data Rb2 is acquired. In the eighth data processing step S11, the second print route data Db2 is generated. In the second printing step S12, printing is performed based on the second print route data Db2.

In the example illustrated in FIG. 13, the sixth data processing step S8, the ninth data processing step S9, the seventh data processing step S10, the eighth data processing step S11, and the second printing step S12 are executed in this order. As another example, the first printing step S7 and the second printing step S12 may be executed after completing the tenth data processing step S6 and the eighth data processing step S11.

Figure 14:
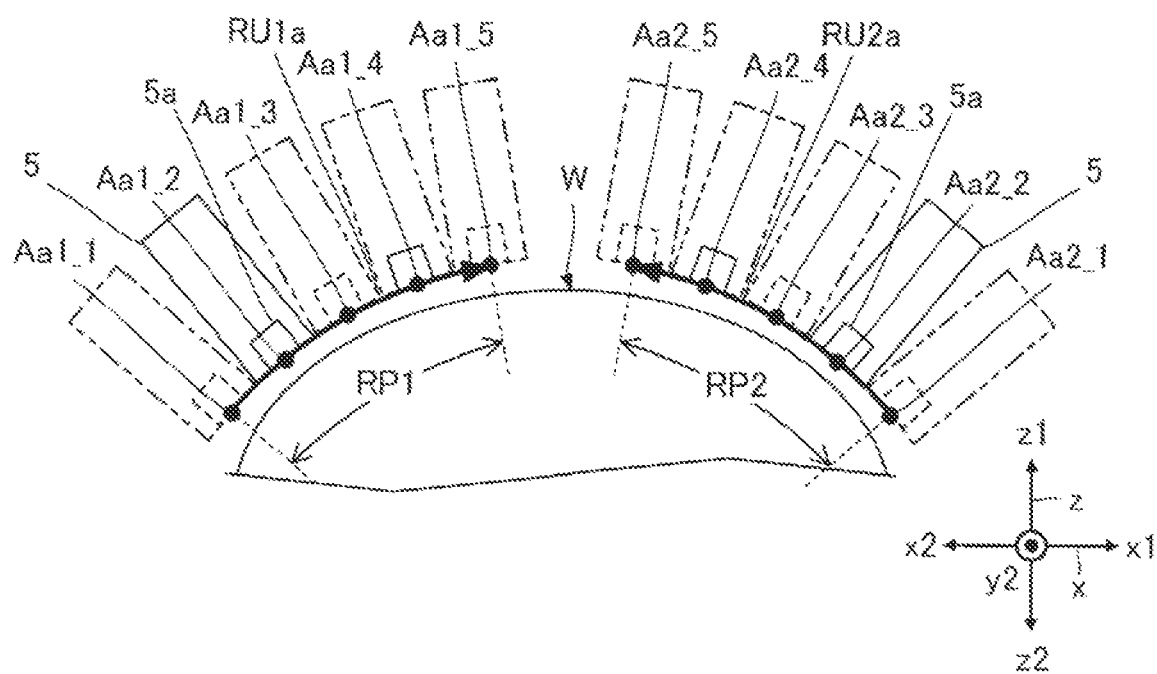
FIG. 14 is a diagram for explaining the acquisition of second initial route data.

FIG. 14 is a diagram for explaining the acquisition of the second initial route data Da2. FIG. 14 illustrates a route RU2a along which the head 5a should move when printing is performed on a second region RP2 different from the first region RP1 of the workpiece W in a space in the workpiece coordinate system, in addition to the first region RP1.

The sixth data processing step S8 is the same as the first data processing step S2 except that pieces of route point data Pa are extracted in such a way as to correspond to the second region RP2. The second initial route data Da2 can be obtained as a result of executing this step.

The ninth data processing step S9 is the same as the fourth data processing step S3 except that the second initial route data Da2 is used in place of the first initial route data Da1. The second reference route point data Ra2 can be obtained as a result of executing this step.

Figure 15:
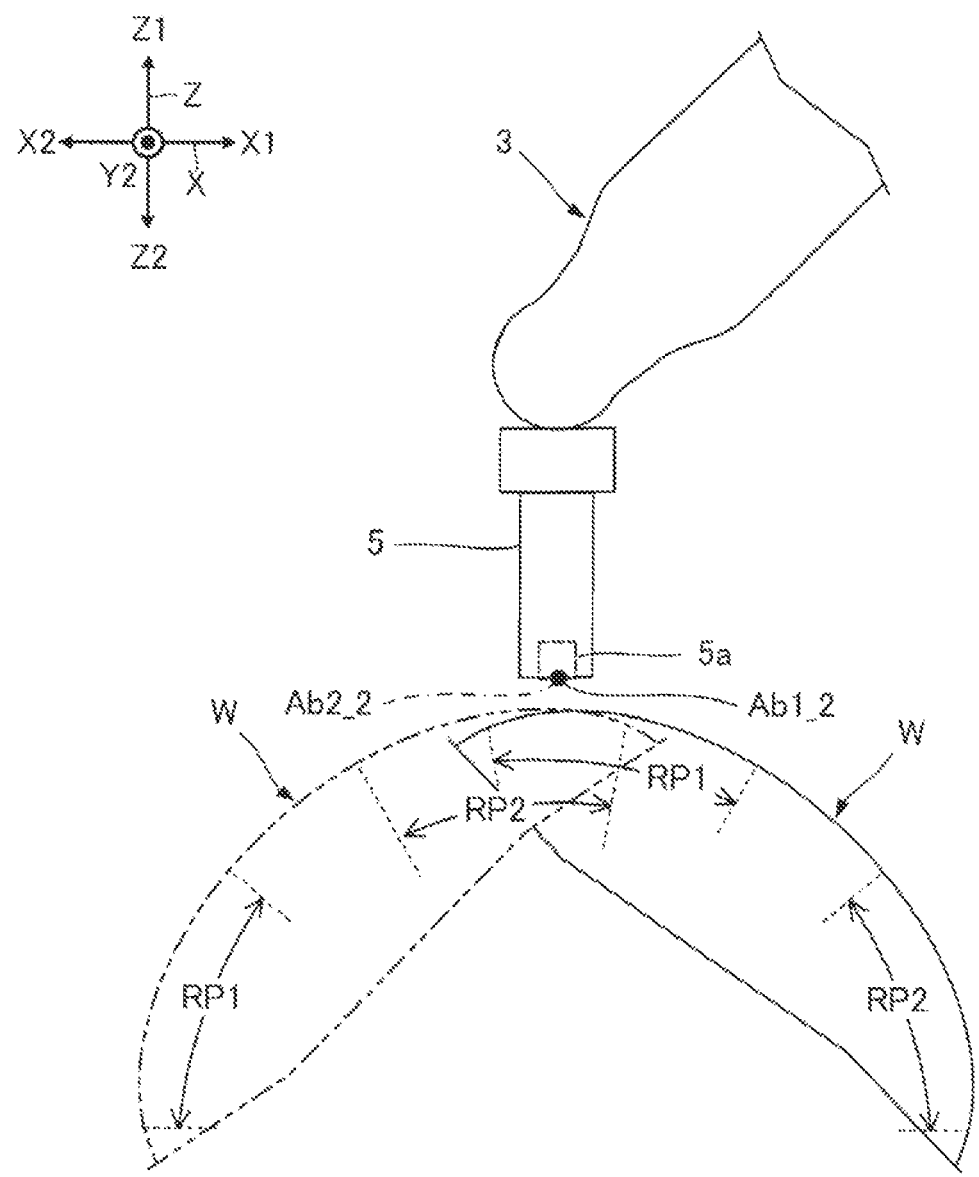
FIG. 15 is a diagram for explaining the acquisition of second head reference point data.

FIG. 15 is a diagram for explaining the acquisition of the second head reference point data Rb2. FIG. 15 illustrates the position and orientation of the head 5a in a space in the robot coordinate system.

The seventh data processing step S10 is executed in the same manner as the second data processing step S4. The second head reference point data Rb2 can be obtained as a result of executing this step. It is preferable if either one, or both, of the position and orientation represented by the first head reference point data Rb1 and either one, or both, of the position and orientation represented by the second head reference point data Rb2 are close to each other; more preferably, they should be equal to each other. In FIG. 15, a case where the position and orientation represented by the first head reference point data Rb1 and the position and orientation represented by the second head reference point data Rb2 are equal to each other is shown as an example. In FIG. 15, the orientation of the workpiece W in the first printing step S7 is indicated by solid-line illustration, and the orientation of the workpiece W in the second printing step S12 is indicated by alternate-long-and-two-short-dashes illustration.

The eighth data processing step S11 is the same as the third data processing step S5 except that the second initial route data Da2 and the second head reference point data Rb2 are used in place of the first initial route data Da1 and the first head reference point data Rb1. The second print route data Db2 can be obtained as a result of executing this step.

The second printing step S12 is the same as the first printing step S7 except that the second print route data Db2 is used in place of the first print route data Db1. Printing is performed on the second region RP2 as a result of executing this step.

The second embodiment described above also makes it possible to reduce the time and effort required to generate the movement path of the head 5a similarly to the first embodiment described earlier. As described earlier, the three-dimensional object printing method according to the present embodiment includes the sixth data processing step S8, the seventh data processing step S10, the eighth data processing step S11, and the second printing step S12 in addition to the foregoing steps of the first embodiment.

In the sixth data processing step S8, the second initial route data Da2 that represents in the workpiece coordinate system the route along which the head 5a is to move is acquired. In the seventh data processing step S10, the second head reference point data Rb2 that represents in the robot coordinate system the position and orientation of the head 5a is acquired. In the eighth data processing step S11, based on the second initial route data Da2 and the second head reference point data Rb2, the second print route data Db2 that represents in the robot coordinate system the route along which the head 5a is to move is generated. In the second printing step S12, ink is ejected from the head 5a onto the workpiece W while the robot 10 is operated based on the second print route data Db2.

In the present embodiment, the second print route data Db2 is generated based on the second initial route data Da2 and the second head reference point data Rb2. Therefore, when the route along which the head 5a should move in a real space needs to be changed, advantageously, the only thing that needs to be done is to change the second head reference point data Rb2.

As described earlier, the second initial route data Da2 includes the pieces of route point data Pa that represent in the workpiece coordinate system the position and orientation of the head 5a. The ninth data processing step S9 is included between the sixth data processing step S8 and the eighth data processing step S11. In the ninth data processing step S9, a particular piece of route point data Pa is selectively acquired as the second reference route point data Ra2 from among the pieces of route point data Pa included in the second initial route data Da2. In the eighth data processing step S11, the second print route data Db2 is generated based on the second reference route point data Ra2 and the second head reference point data Rb2. Therefore, by using the second reference route point data Ra2, it is possible to associate a coordinate value in the workpiece coordinate system with a coordinate value in the robot coordinate system. Moreover, by using this association, it is possible to generate the second print route data Db2 based on the pieces of route point data Pa included in the second initial route data Da2.

It is preferable if the difference between the orientation represented by the first head reference point data Rb1 and the orientation represented by the second head reference point data Rb2 is less than the difference between the orientation represented by the first reference route point data Ra1 and the orientation represented by the second reference route point data Ra2. In this case, the referential orientation of the head 5a in the first printing step and the referential orientation of the head 5a in the second printing step are close to each other and, therefore, a change in orientation between the first printing step and the second printing step is small. This makes it possible to reduce the difference in print quality. That is, if the first printing step is defined as a first path and if the second printing step is defined as a second path, it is possible to reduce the difference in print quality between the paths. Moreover, a significant change in orientation of the head 5a will not occur easily between the paths, for example, as in a case where the ink-ejecting direction in the first path is vertically downward whereas the ink-ejecting direction in the second path is horizontal. The difference in the referential orientation of the head 5a between the paths varies also depending on the curvature of each of the first initial route data Da1 and the second initial route data Da2 and depending on the selection of the first reference route point data Ra1 and the second reference route point data Ra2.

With this considered, it is preferable if the orientation represented by the first reference route point data Ra1 and the orientation represented by the second reference route point data Ra2 are equal to each other.

It is preferable if the difference between the position represented by the first head reference point data Rb1 and the position represented by the second head reference point data Rb2 is less than the difference between the position represented by the first reference route point data Ra1 and the position represented by the second reference route point data Ra2. In this case, the referential position of the head 5a in the first printing step and the referential position of the head 5a in the second printing step are close to each other and, therefore, a change in position between the first printing step and the second printing step is small. This makes it possible to reduce the difference in print quality. That is, if the first printing step is defined as a first path and if the second printing step is defined as a second path, it is possible to reduce the difference in print quality between the paths. Moreover, it is possible to prevent the operating area of the robot 10 in the first path and the second path from being uselessly large. Therefore, it is possible to reduce the risk of collision with other structural object, etc. The difference in the referential position of the head 5a between the paths varies also depending on the curvature of each of the first initial route data Da1 and the second initial route data Da2 and depending on the selection of the first reference route point data Ra1 and the second reference route point data Ra2.

With this considered, it is preferable if the position represented by the first reference route point data Ra1 and the position represented by the second reference route point data Ra2 are equal to each other.

3. Modification Example

The embodiments described as examples above can be modified in various ways. Some specific examples of modification that can be applied to the embodiments described above are described below. Any two or more modification examples selected from the description below may be combined as long as they are not contradictory to each other or one another.

3-1. First Modification Example

In the foregoing embodiments, the first print route data Db1 and the second print route data Db2 are generated using the computer 13. However, the scope of the present disclosure is not limited thereto. A part or a whole of the function of generating the first print route data Db1 and the second print route data Db2 may be implemented by the controller 11.

3-2. Second Modification Example

In the foregoing embodiments, the third data processing step includes the fifth data processing step. However, the scope of the present disclosure is not limited thereto. The fifth data processing step may be executed separately from the third data processing step. In this case, the workpiece positioning point data may be discrete from the first print route data.

3-3. Third Modification Example

In the foregoing embodiments, a structure using a six-axis vertical multi-articulated robot as a movement mechanism has been described so as to show examples. However, the scope of the present disclosure is not limited to this structure. It is sufficient as long as the movement mechanism is able to change the relative position and relative orientation of the head in relation to the workpiece three-dimensionally. Therefore, the movement mechanism may be, for example, a vertical multi-articulated robot other than six-axis one, or may be a horizontal multi-articulated robot. The robot arm may have a stretching/shrinking mechanism, etc. in addition to joints each configured as a rotating mechanism. However, to ensure a good balance between print quality in print operation and the degree of freedom in operation of the movement mechanism during non-printing, it is preferable if the movement mechanism is a vertical multi-articulated robot having six axes or more. A dual-arm robot may be used. In this case, one of its two arms may be used as the first robot, and the other may be used as the second robot.

3-4. Fourth Modification Example

In the foregoing embodiments, the head is fastened to the first robot with screws, etc. However, the scope of the present disclosure is not limited to this structure. For example, the head may be fixed to the first robot by gripping the head using a gripping mechanism such as a hand mounted as an end effector on the first robot.

3-5. Fifth Modification Example

In the foregoing embodiments, a structure using a single kind of ink to perform printing has been described so as to show examples. However, the scope of the present disclosure is not limited to this structure. The present disclosure may be applied to a structure using two or more kinds of ink to perform printing.

3-6. Sixth Modification Example

The scope of application of a three-dimensional object printing apparatus according to the present disclosure is not limited to printing. For example, a three-dimensional object printing apparatus that ejects a colorant solution can be used as an apparatus for manufacturing a color filter of a liquid crystal display device. A three-dimensional object printing apparatus that ejects a solution of a conductive material can be used as a manufacturing apparatus for forming wiring lines and electrodes of a wiring substrate. The disclosed three-dimensional object printing apparatus may be used as a jet dispenser for applying a liquid such as an adhesive to a workpiece.

What is claimed is:

1. A three-dimensional object printing method using a head, a first robot, and a second robot, the head being configured to eject a liquid onto a workpiece, the head being mounted as an end effector of the first robot, the first robot being configured to change a position and an orientation of the head, and the second robot being configured to change a position and an orientation of the workpiece, comprising:
　a first data processing step of acquiring first initial route data that represents a first initial route in a workpiece coordinate system, the first initial route being generated based on workpiece shape data that represents a shape of the workpiece in the workpiece coordinate system;
　a second data processing step of acquiring first head reference point data that represents a position and an orientation of the head in a robot coordinate system;
　a third data processing step of generating, based on the first initial route data and the first head reference point data, first print route data that represents, in the robot coordinate system, a first print route along which the head moves; and a first printing step of ejecting the liquid from the head onto the workpiece while the first robot is configured to cause the head to move along the first print route.

2. The three-dimensional object printing method according to claim 1, further comprising a fourth data processing step between the first data processing step and the third data processing step, wherein the first initial route data includes pieces of route point data that represent, in the workpiece coordinate system, the position and the orientation of the head, in the fourth data processing step, a particular piece of the route point data is selectively acquired as first reference route point data from among the pieces of the route point data included in the first initial route data, and in the third data processing step, the first print route data is generated based on the first reference route point data and the first head reference point data.

3. The three-dimensional object printing method according to claim 2, wherein in the third data processing step, a conversion parameter that represents correspondence between the first reference route point data and the first head reference point data is calculated by comparing a coordinate value indicated by the first reference route point data and a coordinate value indicated by the first head reference point data, and in the third data processing step, the first print route data is generated by applying the conversion parameter to the pieces of the route point data included in the first initial route data.

4. The three-dimensional object printing method according to claim 1, further comprising a fifth data processing step between the second data processing step and the first printing step, wherein the first initial route data further includes workpiece center point data that represents, in the workpiece coordinate system, the position and the orientation of the workpiece, and in the fifth data processing step, first workpiece positioning point data is generated based on the first initial route data, the workpiece center point data, and the first head reference point data, the first workpiece positioning point data representing, in the robot coordinate system, the position at which the workpiece is to be positioned and the orientation in which the workpiece is to be positioned.

5. The three-dimensional object printing method according to claim 4, wherein in the first printing step, based on the first workpiece positioning point data, the second robot is configured to position the workpiece.

6. The three-dimensional object printing method according to claim 2, further comprising:

a sixth data processing step of acquiring second initial route data that represents, in the workpiece coordinate system, a second initial route that is generated based on the workpiece shape data;

a seventh data processing step of acquiring second head reference point data that represents, in the robot coordinate system, a second position and a second orientation of the head;

an eighth data processing step of generating, based on the second initial route data and the second head reference point data, second print route data that represents, in the robot coordinate system, a second print route along which the head moves; and a second printing step of ejecting the liquid from the head onto the workpiece while the second robot is configured to cause the head to move along the second print route.

7. The three-dimensional object printing method according to claim 6, further comprising a ninth data processing step between the sixth data processing step and the eighth data processing step, wherein the second initial route data includes pieces of route point data that represent, in the workpiece coordinate system, the position and the orientation of the head, in the ninth data processing step, a particular piece of the route point data is selectively acquired as second reference route point data from among the pieces of the route point data included in the second initial route data, and in the eighth data processing step, the second print route data is generated based on the second reference route point data and the second head reference point data.

8. The three-dimensional object printing method according to claim 7, wherein a difference between the orientation represented by the first head reference point data and the orientation represented by the second head reference point data is less than a difference between the orientation represented by the first reference route point data and the orientation represented by the second reference route point data.

9. The three-dimensional object printing method according to claim 8, wherein the orientation represented by the first reference route point data and the orientation represented by the second reference route point data are equal to each other.

10. The three-dimensional object printing method according to claim 7, wherein a difference between the position represented by the first head reference point data and the position represented by the second head reference point data is less than a difference between the position represented by the first reference route point data and the position represented by the second reference route point data.

11. The three-dimensional object printing method according to claim 10, wherein the position represented by the first reference route point data and the position represented by the second reference route point data are equal to each other.

12. The three-dimensional object printing method according to claim 1, further comprising a tenth data processing step between the third data processing step and the first printing step, wherein in the tenth data processing step, based on a result of detecting the position where the workpiece is actually positioned and the first print route data, corrected first print route data is generated.

13. The three-dimensional object printing method according to claim 1, further comprising an eleventh data processing step prior to the first data processing step, wherein in the eleventh data processing step, pieces of route point data and a workpiece center point data are generated based on the workpiece shape, data representing a shape of the workpiece in the workpiece coordinate system, the pieces of the route point data represent the position and orientation of the head in the workpiece coordinate system, and the workpiece center point data represents the position and the orientation of the workpiece in the workpiece coordinate system.

* * * * *